US008754162B2

(12) United States Patent
Maljkovic et al.

(10) Patent No.: US 8,754,162 B2
(45) Date of Patent: Jun. 17, 2014

(54) REINFORCED BLEND

(75) Inventors: Nikica Maljkovic, New Orleans, LA (US); Romana B. Chavers, Kiln, MS (US); Mohammad Jamal El-Hibri, Atlanta, GA (US)

(73) Assignee: Solvay Advanced Polymers, L.L.C., Alpharetta, GA (US)

( * ) Notice: Subject to any disclaimer, the term of this patent is extended or adjusted under 35 U.S.C. 154(b) by 820 days.

(21) Appl. No.: 12/281,019

(22) PCT Filed: Mar. 6, 2007

(86) PCT No.: PCT/EP2007/052077
§ 371 (c)(1),
(2), (4) Date: Aug. 28, 2008

(87) PCT Pub. No.: WO2007/101847
PCT Pub. Date: Sep. 13, 2007

(65) Prior Publication Data
US 2009/0036594 A1 Feb. 5, 2009

Related U.S. Application Data

(63) Continuation-in-part of application No. PCT/EP2006/060535, filed on Mar. 7, 2006, and a continuation-in-part of application No. 11/850,739, filed on Sep. 6, 2007, now Pat. No. 7,750,091, which is a continuation of application No. PCT/EP2006/060535, filed on Mar. 7, 2006.

(60) Provisional application No. 60/836,946, filed on Aug. 11, 2006, provisional application No. 60/826,369, filed on Sep. 20, 2006, provisional application No. 60/842,367, filed on Sep. 6, 2006, provisional application No. 60/842,368, filed on Sep. 6, 2006, provisional application No. 60/842,366, filed on Sep. 6, 2006, provisional application No. 60/842,365, filed on Sep. 6, 2006.

(51) Int. Cl.
*C08G 12/42* (2006.01)
*C08L 51/00* (2006.01)
*C08L 61/00* (2006.01)
*B60C 1/00* (2006.01)
*C08K 3/40* (2006.01)
*C08F 283/00* (2006.01)

(52) U.S. Cl.
USPC ............................ 524/542; 524/494; 525/534

(58) Field of Classification Search
USPC .................... 524/494, 542; 525/534
See application file for complete search history.

(56) References Cited

U.S. PATENT DOCUMENTS

| | | | |
|---|---|---|---|
| 4,176,222 A | 11/1979 | Cinderey et al. | |
| 4,365,037 A * | 12/1982 | Adachi et al. | ............... 524/449 |
| 5,227,457 A | 7/1993 | Marrocco et al. | |
| 5,539,048 A | 7/1996 | Gagne et al. | |
| 5,565,543 A | 10/1996 | Marrocco et al. | |
| 5,646,231 A | 7/1997 | Marrocco et al. | |
| 5,654,392 A | 8/1997 | Marrocco et al. | |
| 5,659,005 A | 8/1997 | Marrocco et al. | |
| 5,668,245 A | 9/1997 | Marrocco et al. | |
| 5,670,564 A | 9/1997 | Gagne et al. | |
| 5,721,335 A | 2/1998 | Marrocco et al. | |
| 5,756,581 A | 5/1998 | Marrocco et al. | |
| 5,760,131 A | 6/1998 | Marrocco et al. | |
| 5,824,744 A | 10/1998 | Gagne et al. | |
| 5,827,927 A | 10/1998 | Gagne et al. | |
| 5,869,592 A | 2/1999 | Gagne et al. | |
| 5,886,130 A | 3/1999 | Trimmer et al. | |
| 6,087,467 A | 7/2000 | Marrocco et al. | |
| 6,566,484 B2 | 5/2003 | Gharda et al. | |
| 2003/0130476 A1 | 7/2003 | Kemmish et al. | |
| 2006/0207464 A1 | 9/2006 | Maljkovic et al. | |

FOREIGN PATENT DOCUMENTS

| | | |
|---|---|---|
| CA | 847963 | 7/1970 |
| EP | 418719 A1 | 3/1991 |
| WO | WO9318076 A1 | 9/1993 |
| WO | WO9323475 A1 | 11/1993 |
| WO | WO2006094988 A2 | 9/2006 |
| WO | WO2007101845 A2 | 9/2007 |
| WO | WO2007101852 A2 | 9/2007 |
| WO | WO2007101857 A2 | 9/2007 |
| WO | WO2007101858 A2 | 9/2007 |
| WO | WO2008028695 A1 | 3/2008 |

OTHER PUBLICATIONS

PCT Search Report dated Nov. 7, 2007 for International Application PCT/EP2007/052077 (3 p.).
Weast R.C., "Definitive rules for nomenclature of organic chemistry", CRC Handbook of Chemistry and Physics, 64th edition, (1983-1984), p. C1-C44, CRC Press Inc., Boca Raton, Florida (44 p.).
Randic M., "Aromaticity of Polycyclic Conjugated Hydrocarbons", Chemical Reviews (2003), vol. 103, p. 3449-3605, American Chemical Society ( 158 p.).
Flory P.J., "Principles of Polymer Chemistry", 1953, Chapter 13, p. 555, Cornell University Press (2 p.).
Standard ASTM D790, Historical 2003, "Test Methods for Flexural Properties of Unreinforced and Reinforced Plastics and Electrical Insulating Materials", p. 1-11 (12 p.).
Standard ASTM D256, Historical 2005 Revision A, "Test Methods for Determining the Izod Pendulum Impact Resistance of Plastics", p. 1-20 (21 p.).

(Continued)

*Primary Examiner* — Angela C Scott
(74) *Attorney, Agent, or Firm* — Oblon, Spivak, McClelland, Maier & Neustadt, L.L.P.

(57) ABSTRACT

Blend (B) comprising:
  at least one polyarylene (P1) in a form other than fibers,
  at least one poly(aryl ether ketone) (P2), and
  at least one fibrous filler (F).
Article or part of an article comprising the blend (B).

20 Claims, No Drawings

(56) References Cited

OTHER PUBLICATIONS

Standard ASTM D638, Historical 2003, "Test Method for Tensile Properties of Plastics", p. 1-15 (16 p.).

Standard ASTM D648, Historical 2006, "Test Method for Deflection Temperature of Plastics Under Flexural Load in the Edgewise Position", p. 1-13 (14 p.).

U.S. Appl. No. 11/074,616, filed Mar. 7, 2005, Maljkovic et al.

U.S. Appl. No. 11/850,739, filed Sep. 6, 2007, Maljkovic et al., unpublished.

U.S. Appl. No. 12/061,442, filed Apr. 2, 2008, Maljkovic et al., unpublished.

U.S. Appl. No. 12/281,023, filed Aug. 28, 2008, Thomas et al., unpublished.

U.S. Appl. No. 12/281,027, filed Aug. 28, 2008, Myrick et al., unpublished.

U.S. Appl. No. 12/281,033, filed Aug. 28, 2008, El-Hibri et al, unpublished.

Confidential Sales Information (1 p.).

* cited by examiner

REINFORCED BLEND

CROSS-REFERENCE TO RELATED APPLICATIONS

The present application is (1) a national stage application under 35 U.S.C. §371 of International Application No. PCT/EP2007/052077, filed Mar. 6, 2007, which claims the benefit under 35 U.S.C. §119(a) and (b) of (i) PCT application no. PCT/EP2006/060535 filed Mar. 7, 2006, and which claims the benefit under 35 U.S.C. §119(e) of (ii) U.S. provisional application No. 60/836,946 filed Aug. 11, 2006, (iii) U.S. provisional application No. 60/842,369 filed Sep. 6, 2006, (iv) U.S. provisional application No. 60/842,367 filed Sep. 6, 2006, (v) U.S. provisional application No. 60/842,368 filed Sep. 6, 2006, (vi) U.S. provisional application No. 60/842,366 filed Sep. 6, 2006, and (vii) U.S. provisional application No. 60/842,365 filed Sep. 6, 2006; (2) is a continuation-in-part of U.S. application Ser. No. 11/850,739 filed Sep. 6, 2007, which is a continuation of PCT application no. PCT/EP2006/060535 filed Mar. 7, 2006; and (3) further claims the benefit under 35 U.S.C. §365(a) of PCT Application No. PCT/EP2006/060535, filed Mar. 7, 2006, the whole content of all of these applications being herein incorporated by reference for all purposes.

FIELD OF THE INVENTION

The present invention relates to a new reinforced blend, and to articles and parts of articles made thereof.

BACKGROUND OF THE INVENTION

Neat poly(aryl ether ketone)s such as neat polyetheretherketones (PEEKs), offer a good balance of technical properties, including a very high melting point, excellent thermal stability and chemical resistance (including environmental stress cracking resistance), good ductibililty and processability, high strength, high stiffness and high impact resistance (as characterized by a standard ASTM notched Izod test).

However, for certain demanding applications, a still higher level of strength, stiffness and impact resistance is required which cannot be achieved by neat poly(aryl ether ketone)s.

It has already been found that the desired level of strength and stiffness can be obtained by adding a fibrous filler such as glass fiber to the neat poly(aryl ether ketone). However, such fiber-reinforced poly(aryl ether ketone)s still suffer from the same limitation in impact resistance as that of neat poly(aryl ether ketone)s.

It has also already been found that the desired level of strength and impact resistance can be achieved by neat polyarylenes; because of their outstanding intrinsic strength, similar to that of fiber-reinforced polymers, these neat polyarylenes are often referred to as "self-reinforcing polymers". However, the stiffness of such neat polyarylenes is still not as high as needed in certain demanding applications, although being somewhat higher than that of neat poly(aryl ether ketone)s. Besides, neat polyarylenes suffer from several other important limitations: they have no ductile break, they are difficult to process at the molten state and they have a somewhat lower thermal stability and chemical resistance than polyaryletherketone(s).

Fiber-filled polyarylenes have been incidentally disclosed in U.S. Pat. No. 5,654,392, at col. 24, 1.9-15: "Non limiting examples of additives which may be used with rigid-rod or segmented rigid-rod polyphenylenes are: ( . . . ) carbon fibers, glass fibers, ( . . . ) and the like." Fiber filled polyarylenes, while achieving the desired higher level of strength and stiffness as needed in certain demanding applications, still suffer from the same limitation in impact resistance as neat poly(aryl ether ketone)s; otherwise said, in such fiber filled polyarylenes, the fibrous reinforcing agent, while increasing profitably the stiffness up to the desired level, affects dramatically the impact resistance, causing it to decrease by about one and a half times. Besides, fiber-filled polyarylenes, likewise neat polyarylenes, suffer from several other important limitations: they have no ductile break, they are difficultly processed at the molten state and they have a somewhat lower thermal stability and chemical resistance than poly(aryletherketone)s.

In certain still more demanding applications where articles are used under stress at high temperature, a still more complex problem needs to be solved: in addition to gaining in strength, stiffness and impact resistance, the composition of matter of which the articles are made should further exhibit a higher heat deflection temperature than that of neat poly(aryl ether ketone)s. While fiber-reinforced poly(aryl ether ketone)s meet fully, and even exceed by far, this additional requirement, the use of neat or filled polyarylenes results in a slight to moderate increase of the heat deflection temperature when compared to that of neat poly(aryl ether ketone)s, which may be sometimes sufficient, sometimes not.

In the light of the above, there remains a strong need for materials offering a superior balance of properties, including:
- a very high strength [higher than that of neat poly(aryletherketone)s]
- a very high stiffness [higher than that of neat poly(aryletherketone)s and neat polyarylenes]; and
- a very high impact resistance, as characterized by a standard notched IZOD test [higher than that of neat or fiber-reinforced poly(aryl ether ketone)s and fiber-reinforced polyarylenes].

Desirably, the material should further exhibit:
- a ductile break;
- a good melt processability (better than that of neat or fiber-reinforced polyarylenes);
- a high thermal stability (higher than that of neat or fiber-reinforced polyarylenes); and
- a high chemical resistance (higher than that of neat or fiber-reinforced polyarylenes).

Also, for certain very demanding applications where articles are used under stress at high temperature, the materials should preferably further exhibit a substantially higher heat deflection temperature than that of neat poly(aryl ether ketone)s and neat or fiber-reinforced polyarylenes.

Polymer blends have been widely taught and employed in the art. As broad as this statement may be, the blending of polymers remains an empirical art and the selection of polymers for a blend giving special properties is, in the main, an Edisonian-like choice. In the field of miscibility or compatibility of polymer blends, the art has found predictability to be unattainable, even though considerable work on the matter has been done. According to authorities, "It is well known that, regarding the mixing of thermoplastic polymers, incompatibility is the rule and miscibility and even partial miscibility is the exception. Since most thermoplastic polymers are immiscible in other thermoplastic polymers, the discovery of a homogeneous mixture or partially miscible mixture of two or more thermoplastic polymers is, indeed, inherently unpredictable with any degree of certainty, for example, see P. J. Flory, *Principles of Polymer Chemistry*, Cornell University Press, 1953, Chapter 13, page 555." The miscibility or compatibility of polymer blends is even more also unpredictible when additives such as fibers are incorporated to the polymer blends.

Example 13 of U.S. Pat. No. 5,654,392 (same as above cited) is a prophetic description of a manufacture of a composite material by a pultrusion process involving a polyaryletherketone (more precisely, a polyetheretherketone) at molten state, and a polyarylene (more precisely, a rigid-rod polyphenylene) in the particular form of fibers. By giving credit to a pultrusion process which requires contacting, during a significant amount of time, polyarylene fibers having a $T_g$ as low as about 160° C. with molten polyaryletherketone (i.e. at a temperature above about 340° C.) without affecting the fibrous nature of the polyarylene fibers, US '392 gives thereby credit to the incompatibility and the inmiscibility of polyarylenes with poly(aryletherketone)s, discarding thereby the skilled person from mixing polyarylenes with a poly (aryletherketone)s in a significant amount so as to obtain valuable physical blends, since, in such a case, the expectation would be great to obtain unstable ones, highly subject to phase separation.

THE INVENTION

In its principal aspect, the present invention is directed to a blend (B) comprising:
 at least one polyarylene (P1) in a form other than fibers,
 at least one poly(aryl ether ketone) (P2), and
 at least one fibrous filler (F).

Another aspect of the present invention is directed to a method for preparing the blend (B) as above described which comprises mixing the at least one polyarylene (P1) in a form other than fibers with the at least one poly(aryl ether ketone) (P2) and the at least one fibrous filler (F), at a temperature above the melt temperature of the polyarylene (P1) and the melt temperature of the poly(aryl ether ketone) (P2).

Still another aspect of the present invention is directed to a shaped article or a part of a shaped article comprising the blend (B) as above described, or prepared by the method as above described.

Still other aspects of the present invention are directed to the use of at least one polyarylene (P1) in a form other than fibers as additive of a poly(aryl ether ketone) composition (C2) comprising at least one poly(aryl ether ketone) (P2) and at least one fibrous filler (F), for increasing the level of the impact resistance of the poly(aryl ether ketone) composition (C2), as determined by a notched IZOD test (ASTM D-256), up to a level which is higher than on one hand that of the impact resistance of the poly(aryl ether ketone) composition (C2) and, on the other hand that of the impact resistance of a polyarylene composition (C1) obtained by replacing, weight for weight in the poly(aryl ether ketone) composition (C2), all the poly(aryl ether ketone) (P2) by the polyarylene (P1), and, reciprocally,
to the use of at least one poly(aryl ether ketone) (P2) as additive of a polyarylene composition (C1) comprising at least one polyarylene (P1) in a form other than fibers and at least one fibrous filler (F), for increasing the level of the impact resistance of the polyarylene composition (C1), as determined by a notched IZOD test (ASTM D-256), up to a level which is higher than both that of the impact resistance of the polyarylene composition (C1) and that of the impact resistance of a poly(aryl ether ketone) composition (C2) obtained by replacing, weight for weight in the polyarylene composition (C1), all the polyarylene (P1) by the poly(aryl ether ketone) (P2).

According to the above aspects, the blend (B) may be notably in the form of shaped articles or parts of shaped articles.

DETAILED DESCRIPTION OF THE INVENTION

The weight of the polyarylene (P1), based on the total weight of the polyarylene (P1) and the poly(aryl ether ketone) (P2), is advantageously of at least 5%, preferably at least 10%, more preferably at least 20% and still more preferably at least 30%. On the other hand, the weight of the polyarylene (P1), based on the total weight of the polyarylene (P1) and the poly(aryl ether ketone) (P2), is advantageously of at most 80%, preferably at most 70%, more preferably at most 60%, still more preferably at most 50% and most preferably at most 40%.

The total weight of the polyarylene (P1) and of the poly (aryl ether ketone) (P2), based on the total weight of the blend (B), is advantageously of at least 35%, preferably at least 50%, more preferably at least 60% and still more preferably at least 65%. On the other hand, the total weight of the polyarylene (P1) and of the poly(aryl ether ketone) (P2), based on the total weight of the blend (B), is advantageously of at most 95%, preferably at most 90%, more preferably at most 80% and still more preferably at most 75%.

The weight of the polyarylene (P1), based on the total weight of the blend (B), is advantageously of at least 3%, preferably at least 7%, more preferably at least 15% and still more preferably at least 20%. On the other hand, the weight of the polyarylene (P1), based on the total weight of the blend (B), is advantageously of at most 55%, preferably at most 50%, more preferably at most 40%, still more preferably at most 35% and most preferably at most 30%.

The weight of the poly(aryl ether ketone) (P2), based on the total weight of the blend (B), is advantageously of at least 15%, preferably at least 20% and more preferably at least 30%, still more preferably at least 35% and most preferably at least 40%. On the other hand, the weight of the poly(aryl ether ketone) (P2), based on the total weight of the blend (B), is advantageously of at most 65%, preferably at most 60%, more preferably at most 55%, and still more preferably at most 50%.

The weight of the fibrous filler (F), based on the total weight of the blend (B), is advantageously of at least 5%, preferably at least 10%, more preferably at least 20% and still more preferably at most 25%. On the other hand, the weight of the fibrous filler (F), based on the total weight of the blend (B), is advantageously of at most 65%, preferably at most 50%, more preferably at most 40% and still more preferably at most 35%.

The Polyarylene (P1)

For the purpose of the present invention, an arylene group is a hydrocarbon divalent group consisting of one core composed of one benzenic ring or of a plurality of benzenic rings fused together by sharing two or more neighboring ring carbon atoms, and of two ends.

Non limitative examples of arylene groups are phenylenes, naphthylenes, anthrylenes, phenanthrylenes, tetracenylenes, triphenylylenes, pyrenylenes, and perylenylenes. The arylene groups (especially the numbering of the ring carbon atoms) were named in accordance with the recommendations of the CRC Handbook of Chemistry and Physics, 64$^{th}$ edition, pages C1-C44, especially p. C11-C12.

Arylene groups present usually a certain level of aromaticity; for this reason, they are often reported as "aromatic" groups. The level of aromaticity of the arylene groups depends on the nature of the arylene group; as thoroughly explained in Chem. Rev. 2003, 103, 3449-3605, "Aromaticity of Polycyclic Conjugated Hydrocarbons", the level of aromaticity of a polycyclic aromatic hydrocarbon can be notably quantified by the "index of benzene character" B, as defined on p. 3531 of the same paper; values of B for a large set of polycyclic aromatic hydrocarbon are reported on table 40, same page.

An end of an arylene group is a free electron of a carbon atom contained in a (or the) benzenic ring of the arylene group, wherein an hydrogen atom linked to said carbon atom has been removed. Each end of an arylene group is capable of forming a linkage with another chemical group. An end of an arylene group, or more precisely the linkage capable of being formed by said end, can be characterized by a direction and by a sense; to the purpose of the present invention, the sense of the end of an arylene group is defined as going from the inside of the core of the arylene group to the outside of said core. As concerns more precisely arylene groups the ends of which have the same direction, such ends can be either of the same or opposite sense; also, their ends can be in the straight foregoing of each other, or not (otherwise said, they can be disjoint).

A polyarylene is intended to denote a polymer, other than a poly(aryl ether ketone) as defined below, of which more than 25 wt. % of the recurring units are recurring units (R1) of one or more formulae consisting of an optionally substituted arylene group, provided said optionally substituted arylene group is linked by each of its two ends to two other optionally substituted arylene groups via a direct C—C linkage. That the optionally substituted arylene group is linked by each of its two ends to two other optionally substituted arylene groups via a direct C—C linkage, is an essential feature of the recurring units (R1); thus, an arylene recurring unit which is linked by at least one of its two ends to a group other than an arylene group such as phenylene recurring units $\phi_1$, $\phi_2$ and $\phi_{2'}$ below:

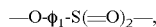
—O-$\phi_1$-S(=O)$_2$—,

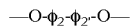
—O-$\phi_2$-$\phi_{2'}$-O— are not recurring units (R1) in the sense of the present invention.

The arylene groups of which the recurring units (R1) consist can be unsubstituted. Alternatively, they can be substituted by at least one monovalent substituting group.

The monovalent substituting group is usually not polymeric in nature; its molecular weight is preferably below 500, more preferably below 300, still more preferably below 200 and most preferably below 150.

The monovalent substituting group is advantageously a solubilizing group. A solubilizing group is one increasing the solubility of the polyarylene (P1) in at least one organic solvent, in particular in at least one of dimethylformamide, N-methylpyrrolidinone, hexamethylphosphoric triamide, benzene, tetrahydrofuran and dimethoxyethane, which can be used as solvents during the synthesis of the polyarylene (P1) by a solution polymerization process.

The monovalent substituting group is also advantageously a group which increases the fusibility of the polyarylene (P1), i.e. it lowers its glass transition temperature and its melt viscosity, so as to desirably make the polyarylene (P1) suitable for thermoprocessing.

Preferably, the monovalent substituting group is chosen from:
hydrocarbyls such as alkyls, aryls, alkylaryls and aralkyls
halogenos such as —Cl, —Br, —F and —I;
hydrocarbyl groups partially or completely substituted by at least one halogen atom such as halogenoalkyls, halogenoaryls, halogenoalkylaryls and halogenoaralkyls
hydroxyl;
hydrocarbyl groups substituted by at least one hydroxyl group, such as hydroxyalkyls, hydroxyaryls, hydroxyalkylaryls and hydroxyaralkyls;
hydrocarbyloxys [—O—R, where R is a hydrocarbyl group], such as alkoxys, aryloxys, alkylaryloxys and aralkyloxys
amino (—NH$_2$);
hydrocarbyl groups substituted by at least one amino group, such as aminoalkyls and aminoaryls;
hydrocarbylamines [—NHR or —NR$_2$, where R is a hydrocarbyl group] such as alkylamines and arylamines;
carboxylic acids and their metal or ammonium salts, carboxylic acid halides, carboxylic anhydrides;
hydrocarbyl groups substituted by at least one of carboxylic acids, metals or ammonium salts thereof, carboxylic acid halides and carboxylic anhydrides, such as —R—C(=O)OH where R is an alkyl or an aryl group;
hydrocarbylesters [—C(=O)OR or —O—C(=O)R, where R is a hydrocarbyl group] such as alkylesters, arylesters, alkylarylesters and aralkylesters
amido [—C(=O)NH$_2$];
hydrocarbyl groups substituted by at least one amido group;
hydrocarbylamide monoesters [—C(=O)NHR or —NH—C(=O)—R, where R is a hydrocarbyl group], such as alkylamides, arylamides, alkylarylamides and aralkylamides, and hydrocarbylamide diesters [—C(=O)NR$_2$ or —N—C(=O)R$_2$, where R are a hydrocarbyl groups], such as dialkylamides and diarylamides
sulfinic acid (—SO$_2$H), sulfonic acid (—SO$_3$H), their metal or ammonium salts,
hydrocarbylsulfones [—S(=O)$_2$—R, where R is the hydrocarbyl group], such as alkylsulfones, arylsulfones, alkylarylsulfones, aralkylsulfones;
aldehyde [—C(=O)H] and haloformyls [—C(=O)X, wherein X is a halogen atom];
hydrocarbylketones [—C(=O)—R, where R is a hydrocarbyl group], such as alkylketones, arylketones, alkylarylketones and aralkylketones
hydrocarbyloxyhydrocarbylketones [—C(=O)—R$^1$—O—R$^2$, where R$^1$ is a divalent hydrocarbon group such as an alkylene, an arylene, an alkylarylene or an aralkylene, preferably a C$_1$-C$_{18}$ alkylene, a phenylene, a phenylene group substituted by at least one alkyl group, or an alkylene group substituted by at least one phenyl group; and R$^2$ is a hydrocarbyl group, such as an alkyl, aryl, alkylaryl or aralkyl group], such as alkyloxyalkylketones, alkyloxyarylketones, alkyloxyalkylarylketones, alkyloxyaralkylketones, aryloxyalkylketones, aryloxyarylketones, aryloxyalkylarylketones and aryloxyaralkylketones
any of the above groups comprising at least one hydrocarbyl group or a divalent hydrocarbon group R$^1$, wherein said hydrocarbyl group or said R$^1$ is itself substituted by at least one of the above listed monovalent substituting groups, e.g. an arylketone —C(=O)—R, where R is an aryl group substituted by one hydroxyl group;
where:
the hydrocarbyl groups contain preferably from 1 and 30 carbon atoms, more preferably from 1 to 12 carbon atoms and still more preferably from 1 to 6 carbon atoms;

the alkyl groups contain preferably from 1 to 18 carbon atoms, and more preferably from 1 to 6 carbon atoms; very preferably, they are chosen from methyl, ethyl, n-propyl, isopropyl, n-butyl, isobutyl and tert-butyl;

the aryl groups are defined as monovalent groups consisting of one end and one core composed of one benzenic ring (such the phenyl group) or of a plurality of benzenic rings directly linked to each other via a carbon-carbon linkage (such as the biphenyl group) or fused together by sharing two or more neighboring ring carbon atoms (such as the naphthyl groups), and wherein the ring carbon atoms are possibly substituted by at least one nitrogen, oxygen or sulfur atom; preferably, in the aryl groups, no ring carbon atom is substituted;

the aryl groups contain preferably from 6 to 30 carbon atoms; more preferably, they are phenyl groups;

the alkyl group which is contained in the alkylaryl groups meets the preferences of the alkyl groups as above expressed;

the aryl group which is contained in the aralkyl groups meets the preferences of the aryl groups as above expressed.

More preferably, the monovalent substituting group is chosen from hydrocarbylketones [—C(=O)—R, where R is a hydrocarbyl group] and hydrocarbyloxyhydrocarbylketones [—C(=O)—$R^1$—O—$R^2$, where $R^1$ is a divalent hydrocarbon group and $R^2$ is a hydrocarbyl group], said hydrocarbylketones and hydrocarbyloxyhydrocarbylketones being unsubstituted or substituted by at least one of the above listed monovalent substituting groups.

Still more preferably, the monovalent substituting group is chosen from arylketones and aryloxyarylketones, said arylketones and aryloxyarylketones being unsubstituted or substituted by at least one of the above listed monovalent substituting groups.

Most preferably, the monovalent substituting group is an (unsubstituted) arylketone, in particular it is phenylketone [—C(=O)-phenyl].

The core of the optionally substituted arylene group of the recurring units (R1) is composed of preferably at most 3, more preferably at most 2, and still more preferably at most one benzenic ring. Then, when the core of the optionally substituted arylene group of the recurring units (R1) is composed of one benzenic ring, the recurring units (R1) are of one or more formulae consisting of an optionally substituted phenylene group, provided said optionally substituted phenylene group is linked by each of its two ends to two other optionally substituted arylene groups via a direct C—C linkage.

As above explained, the optionally substituted arylene group of the recurring units (R1) is linked by each of its two ends to two other optionally substituted arylene groups via a direct C—C linkage. Preferably, it is linked by each of its two ends to two other optionally substituted phenylene groups via a direct C—C linkage.

As also above explained, both ends of the optionally substituted arylene group of the recurring units (R1) can be characterized notably by a direction and by a sense.

A first set of recurring units suitable as recurring units (R1) is composed of optionally substituted arylene groups, the ends of which
have the same direction,
are of opposite sense, and
are in the straight foregoing of each other
[hereafter, recurring units (R1-a)].

Non limitative examples of such optionally substituted arylene groups include:

1,4-phenylene (also named p-phenylene) 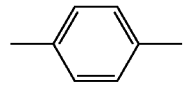

1,4-naphtylene 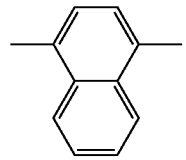

1,4-phenanthrylene and 2,7-phenanthrylene 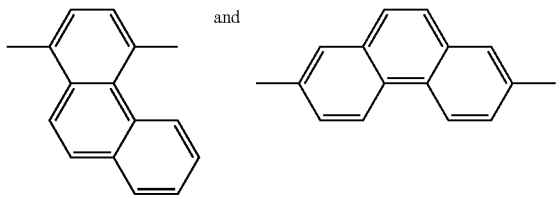

1,4-anthrylene and 9,10-anthrylene 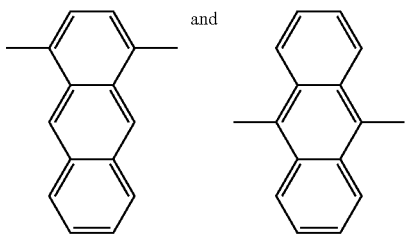

-continued
2,7-pyrenylene
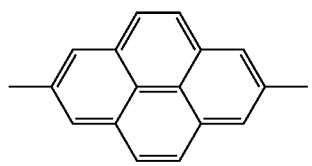
1,4-naphthacenylene and
5,12-naphthacenylene
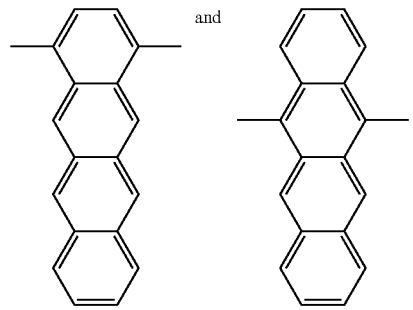
1,4-chrysenylene
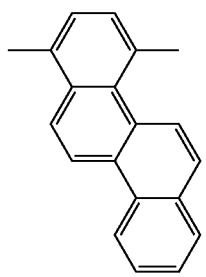 [SMILES: Cc1ccc(C)c2c1ccc1c3ccccc3ccc12]
1,4-triphenylylene and
2,7-triphenylylene
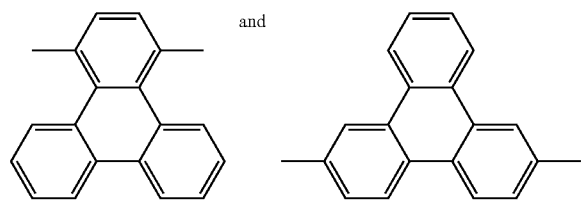
1,4-pentacenylene,
5,14-pentacenylene and
6,13-pentacenylene
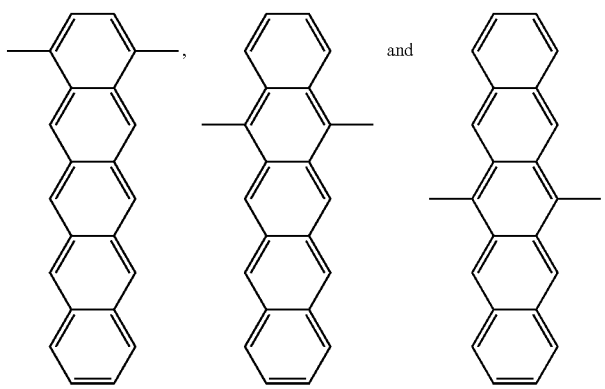
1,6-coronenylene
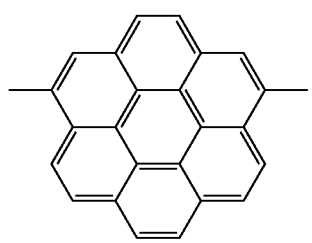

| | |
|---|---|
| 1,4-trinaphthylenylene, 2,9-trinaphthylenylene and 5,18-trinaphthylenylene | 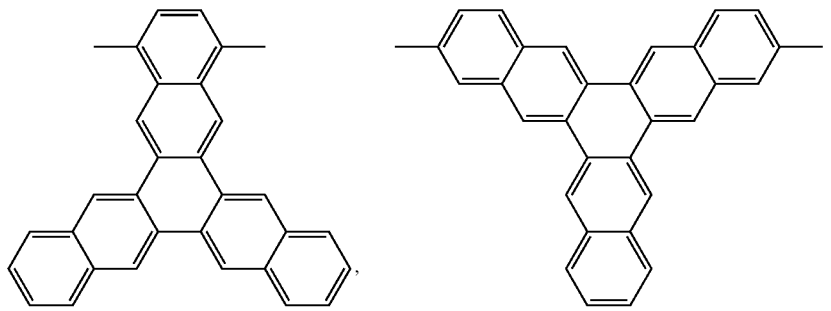 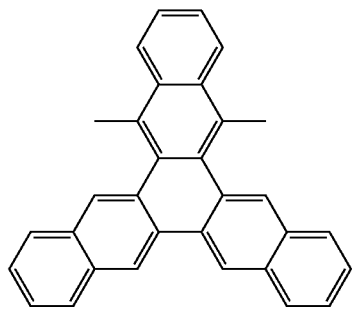 [SMILES: Cc1c2ccccc2c(C)c2c3cc4ccccc4cc3c3cc4ccccc4cc3c12] | and any of these groups substituted by at least one monovalent substituting group, as above defined, in particular by a phenylketone group.

Good results were obtained when recurring units (R1-a) are optionally substituted p-phenylenes.

Recurring units (R1-a), when contained in the polyarylene (P1), result in straight polymer chains exhibiting an outstanding rigidity. For this reason, such polyarylenes (P1) are commonly referred to as "rigid-rod polymers".

A second set of recurring units suitable as recurring (R1) is composed of optionally substituted arylene groups, the ends of which either have a different direction, forming thus together an angle between 0 and 180°, said angle being possibly acute or obtuse,
or have the same direction and the same sense,
or have the same direction, are of opposite sense and are disjoint (i.e. not in the straight foregoing of each other) [globally hereafter referred to as recurring units (R1-b)].

Then, a first subset of recurring units (R1-b) suitable as recurring units (R1) is composed of optionally substituted arylene groups, the ends of which have a different direction, forming together an acute angle [recurring units (R1-b1)]. Non limitative examples of optionally substituted arylene groups the ends of which have a direction different from each other, include:

| | |
|---|---|
| 1,2-phenylene (or o-phenylene) | 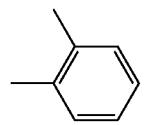 |
| 1,2-, 2,3- and 1,7-naphtylenes | 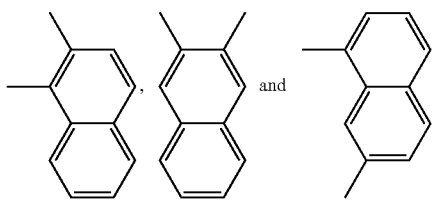 |
| 1,2-, 1,8-, 1,9-, 2,3-, 2,5- and 2,10-phenanthrylenes | 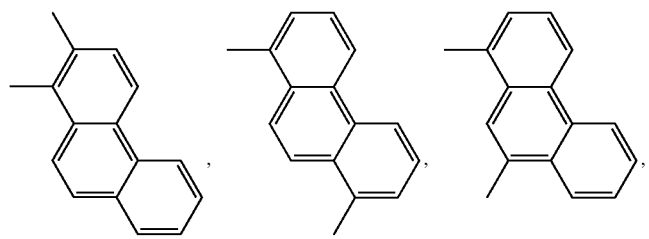 |

-continued 1,2- and 1,7-anthrylenes 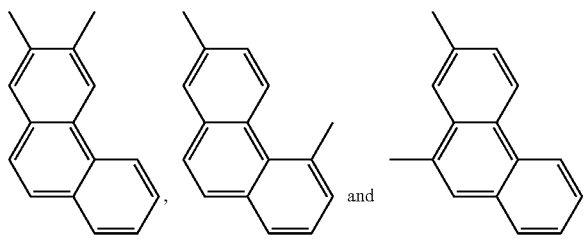

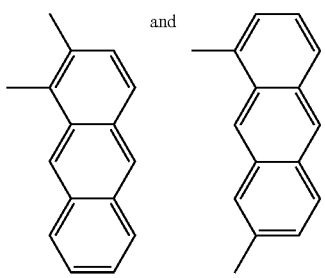

and any of these groups substituted by at least one monovalent substituting group, as above defined, in particular by a phenylketone group.

A second subset of recurring units (R1-b) suitable as recurring units (R1) is composed of optionally substituted arylene groups, the ends of which have a different direction, forming together an obtuse angle [recurring units (R1-b2)]. Non limitative examples of optionally substituted arylene groups the ends of which have a direction different from each other, include:

1,3-phenylene (or m-phenylene) 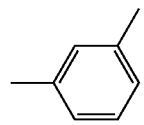

1,3- and 1,6-naphtylenes 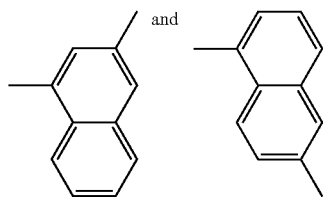

1,3-, 1,5-, 1,7-, 2,4-, 2,9- and 3,10-phenanthrylenes 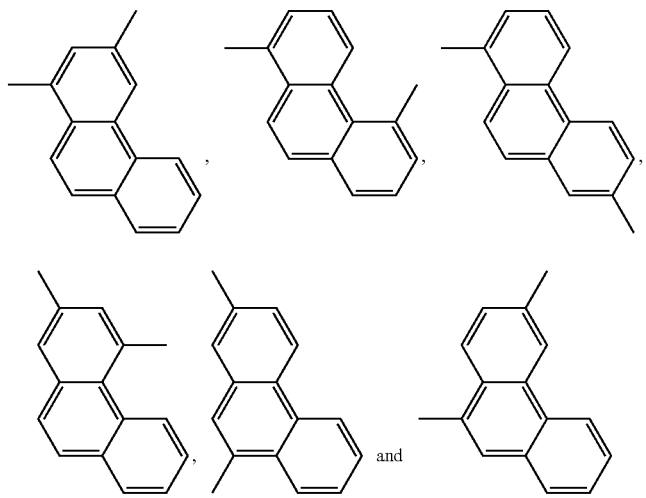

| | |
|---|---|
| 1,3- and 1,6-anthrylenes | 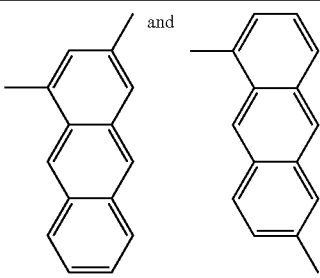 | and any of these groups substituted by at least one monovalent substituting group, as above defined, in particular by a phenylketone group.

A third subset of recurring units (R1-b) is composed of optionally substituted arylene groups, the ends of which have the same direction and the same sense [recurring units (R1-b3)]. Non limitative examples of optionally substituted arylene groups the ends of which the same direction and the same sense include:

| | |
|---|---|
| 1,8-naphthylene | 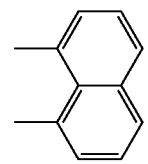 |
| 1,10- and 3,5-phenanthrylenes | 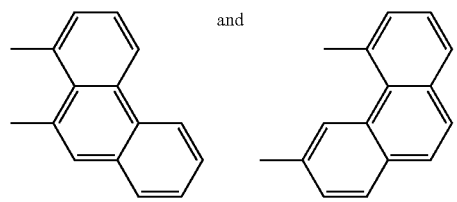 |
| 1,8- and 1,9-anthrylenes | 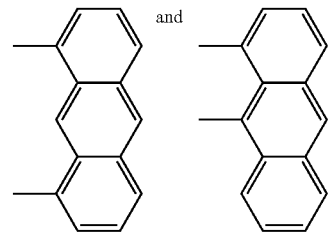 | and any of these groups substituted by at least one monovalent substituting group, as above defined, in particular by a phenylketone group.

A fourth subset of recurring units (R1-b) is composed of optionally substituted arylene groups, the ends of which have the same direction, are of opposite sense and are disjoint [recurring units (R1-b4)]. Non limitative examples of such optionally substituted arylene groups include:

| | |
|---|---|
| 1,5- and 2,6-naphtylenes | 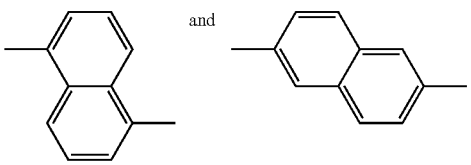 |

1,6-, 3,9- and 4,10-phenanthrylenes

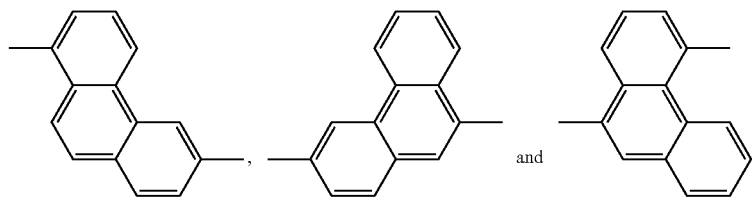

1,5-, 1,10- and 2,6-anthrylenes

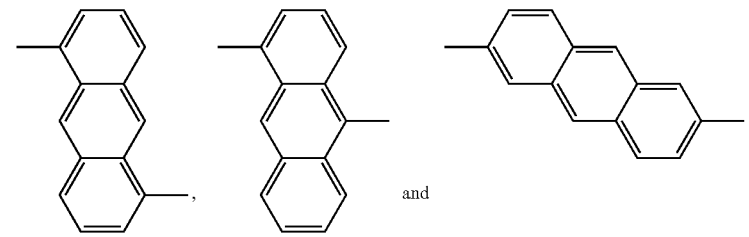

and any of these groups substituted by at least one monovalent substituting group, as above defined, in particular by a phenylketone group. Preferably, recurring units (R1-b) are chosen from recurring units (R1-b1), recurring units (R1-b2) and recurring units (R1-b4). More preferably, recurring units (R1-b) are chosen from recurring units (R1-b1) and recurring units (R1-b2). Still more preferably, recurring units (R1-b) are chosen from recurring units (R1-b1). Good results were obtained when recurring units (R1-b) are optionally substituted m-phenylenes.

Recurring units (R1-b), when contained in the polyarylene (P1), result in more or less kinked polymer chains, exhibiting a higher solubility and fusibility than straight polymer chains. For this reason, such polyarylenes (P1) are commonly referred to as "kinked polymers".

Recurring units (R1) are preferably chosen from:
recurring units (R1-a) which are substituted by at least one monovalent substituting group [choice (A)]; and
mixes of recurring units (R1-a), which can be substituted or not by at least one monovalent substituting group, with recurring units (R1-b), which can be substituted or not by at least one monovalent substituting group [choice (B)].

Choice (B) is generally more preferred than choice A.

Choice (A)

Recurring units of choice (A) are recurring units (R1-a) which are substituted by at least one monovalent substituting group.

Said recurring units are preferably p-phenylenes substituted by at least one monovalent substituting group.

Very preferably, they are p-phenylenes substituted by at least one monovalent substituting group chosen from hydrocarbylketones [—C(=O)—R, where R is a hydrocarbyl group] and hydrocarbyloxyhydrocarbylketones [—C(=O)—R$^1$—O—R$^2$, where R$^1$ is a divalent hydrocarbon group and R$^2$ is a hydrocarbyl group], said hydrocarbylketones and hydrocarbyloxyhydrocarbylketones being themselves unsubstituted or substituted by at least one monovalent substituting group as those above listed.

Still more preferably, they are p-phenylenes substituted by at least one monovalent substituting group chosen from arylketones and aryloxyarylketones, said arylketones and aryloxyarylketones being unsubstituted or substituted by at least one monovalent substituting group as those above listed.

Most preferably, they are p-phenylenes substituted by an arylketone group, in particular by the phenylketone group.

Choice (B)

Recurring units of choice (B) are a mix of recurring units (R1-a), which can be substituted or not by at least one monovalent substituting group, with recurring units (R1-b), which can be substituted or not by at least one monovalent substituting group. When such a mix of recurring units is contained in the polyarylene (P1), said polyarylene (P1) is commonly referred to as "a kinked rigid-rod polymer".

The recurring units of choice (B) are preferably a mix (MB) of recurring units (R1-a) chosen from optionally substituted p-phenylenes, with recurring units (R1-b) chosen from (i) optionally substituted m-phenylenes and (ii) mixes of optionally substituted m-phenylenes with optionally substituted o-phenylenes.

The recurring units (R1-a) of the mix (MB) are preferably p-phenylene units substituted by at least one substituting group. More preferably, the recurring units (R1-a) of the mix (MB) are p-phenylenes substituted by at least one monovalent substituting group chosen from hydrocarbylketones [—C(=O)—R, where R is a hydrocarbyl group] and hydrocarbyloxyhydrocarbylketones [—C(=O)—R$^1$—O—R$^2$, where R$^1$ is a divalent hydrocarbon group and R$^2$ is a hydrocarbyl group], said hydrocarbylketones and hydrocarbyloxyhydrocarbylketones being themselves unsubstituted or substituted by at least one monovalent substituting group as those above listed. Still more preferably, the recurring units (R1-a) of the mix (MB) are p-phenylenes substituted by at least one monovalent substituting group chosen from arylketones and aryloxyarylketones, said arylketones and aryloxyarylketones being unsubstituted or substituted by at least one monovalent substituting group as those above listed. Most preferably, they are p-phenylenes substituted by an arylketone group, in particular by the phenylketone group.

Essentially all, if not all, the recurring units (R1-b) of the mix (MB) are m-phenylene units optionally substituted by at least one substituting group. More preferably, essentially all, if not all, the recurring units (R1-b) of the mix (MB) are m-phenylene units which are optionally substituted by at least one monovalent substituting group chosen from hydrocarbylketones [—C(=O)—R, where R is a hydrocarbyl group] and hydrocarbyloxyhydrocarbylketones [—C(=O)—R$^1$—O—R$^2$, where R$^1$ is a divalent hydrocarbon group and R$^2$ is a hydrocarbyl group], said hydrocarbylketones and hydrocarbyloxyhydrocarbylketones being themselves unsubstituted or substituted by at least one monovalent substituting group as those above listed. Still more preferably, essentially all, if not all, the recurring units (R1-b) of the mix (MB) are unsubstituted m-phenylene units. Most preferably, all the recurring units (R1-b) are m-phenylene units.

In the mix (MB), the mole ratio of the recurring units (R1-b), based on the total number of moles of the recurring units (R1-a) and (R1-b), is usually of at least 1%, preferably at least 5%, more preferably at least 20%, still more preferably at least 30% and most preferably at least 40%. On the other hand, in the mix (MB), the mole ratio of the recurring units (R1-b), based on the total number of moles of the recurring units (R1-a) and (R1-b), is usually of at most 99%, preferably at most 95%, more preferably at most 80%, still more preferably at most 70% and most preferably at most 60%.

Good results were obtained when the recurring units of choice (B) were a mix of p-phenylene substituted by a phenylketone group with unsubstituted m-phenylene, in a mole ratio of about 50:50.

The polyarylene (P1) may be notably a homopolymer, a random, alternating or block copolymer.

Optionally, the polyarylene (P1) may further comprise recurring units (R1*), different from recurring units (R1).

Recurring units (R1*) may contain or not at least one strong divalent electron withdrawing group linked on each of its ends to an arylene group. Non limitative examples of recurring units (R1*) free of such strong divalent electron withdrawing group are:

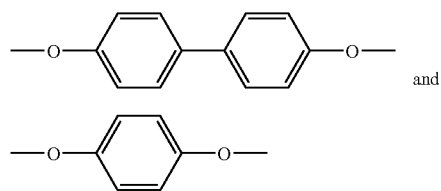

(1)

and

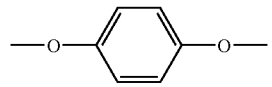

(2)

Recurring units (R1*) contain preferably at least one strong divalent electron withdrawing group linked on each of its ends to an arylene group, in particular a p-phenylene group. The divalent electron withdrawing group is preferably chosen from the sulfone group [—S(═O)$_2$—], the carbonyl group [—C(═O)—], the vinylene group [—CH═CH—], the sulfoxide group [—S(═O)—], the azo group [—N═N—], saturated fluorocarbon groups like —C(CF$_3$)$_2$—, organic phosphine oxide groups [—P(═O)(═R$_h$)—, where R$_h$ is a hydrocarbyl group] and the ethylidene group [—C(═CA$_2$)—, where A can be hydrogen or halogen]. More preferably, the divalent electron withdrawing group is chosen from the sulfone group and the carbonyl group. Still more preferably, recurring units (R1*) are chosen from:

(i) recurring units of formula

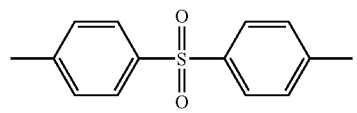

(3)

(ii) recurring units of formula

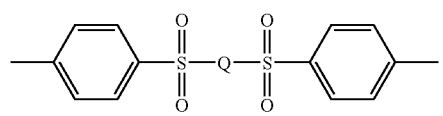

(4)

wherein Q is a group chosen from

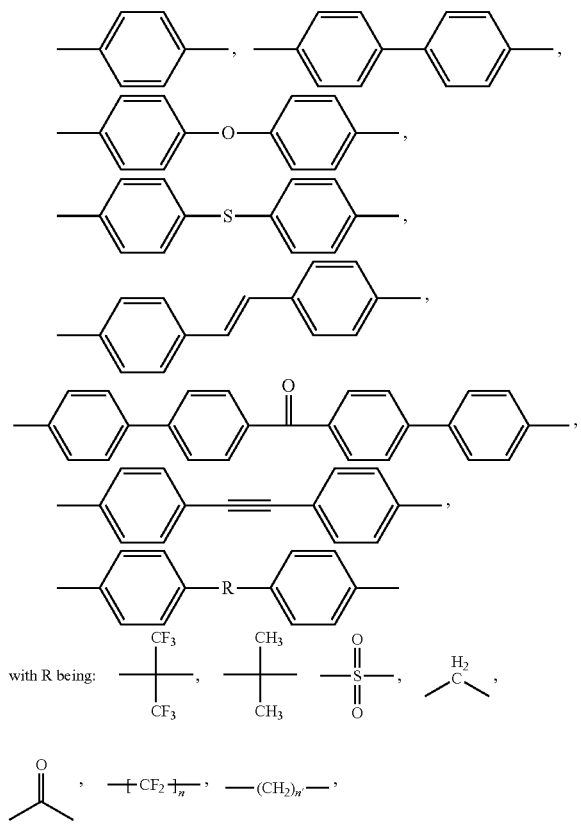

with n being an integer from 1 to 6 and n' being an integer from 2 to 6, Q being preferably chosen from

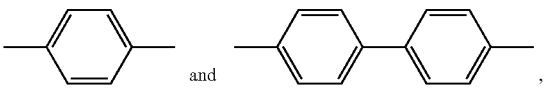

and (iii) recurring units of formula

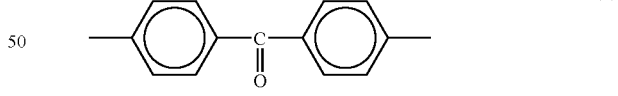

(5)

(iv) recurring units of formula

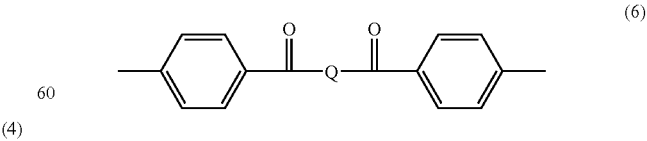

(6)

Preferably more than 25 wt. %, more preferably more than 50 wt. %, and still more preferably more than 90 wt. % of the recurring units of the polyarylene (P1) are recurring units (R1). Most preferably, essentially all, if not all, the recurring units of the polyarylene (P1) are recurring units (R1).

Excellent results were obtained when the polyarylene (P1) was a polyphenylene copolymer, essentially all, if not all, the recurring units of which consisted of a mix of p-phenylene substituted by a phenylketone group with unsubstituted m-phenylene in a mole ratio p-phenylene:m-phenylene of from 5:95 to 95:5, preferably of from 70:30 to 30:70, more preferably of from 60:40 to 40:60, and still more preferably of about 50:50. Such a polyphenylene copolymer is commercially available from Solvay Advanced Polymers, L.L.C. as PRIMOSPIRE™ PR-250 polyphenylene, formerly known as PARMAX® 1500.

The polyarylene (P1) has usually a number average molecular weight greater than 1000, preferably greater than 5000, more preferably greater than about 10000 and still more preferably greater than 15000. On the other hand, the number average molecular weight of the polyarylene (P1) is usually below 100000, and preferably below 70000. In a certain embodiment, the number average molecular weight of the polyarylene (P1) is above 35000. In another embodiment, it is of at most 35000; in this embodiment, it is often of at most 25000 and sometimes of at most 20000. The number average molecular weight of a polyarylene, in particular that of the polyarylene (P1), is advantageously determined by: (1) measuring a "relative" number average molecular weight of the polyarylene by Gel Permeation Chromatography (GPC) using polystyrene calibration standards, then (2) dividing the so-measured "relative" number average molecular weight by a factor 2. It is proceeded accordingly because the skilled in the art who is a specialist of polyarylenes knows that their "relative" number average molecular weight, as measured by GPC, are generally off by a factor of about 2 times; it has already been accounted for this correction factor in all the above cited lower and upper limits of molecular weight.

The polyarylene (P1) can be amorphous (i.e. it has no melting point) or semi-crystalline (i.e. it has a melting point). It is preferably amorphous.

The polyarylene (P1) has a glass transition temperature of advantageously above 50° C., preferably above 120° C. and more preferably above 150° C.

The polyarylene (P1) can be prepared by any method. Methods well known in the art to prepare the polyarylene (P1) are described notably in U.S. Pat. Nos. 5,227,457; 5,539,048; 5,565,543; 5,646,231; 5,654,392, 5,659,005, 5,668,245; 5,670,564; 5,721,335; 5,756,581; 5,760,131; 5,824,744; 5,827,927; 5,869,592; 5,886,130; and 6,087,467, the whole content of which is incorporated herein by reference. A suitable method for preparing the polyarylene (P1) comprises polymerizing, preferably by reductive coupling, at least one dihaloarylene molecular compound consisting of one optionally substituted arylene group, which is linked on each of its two ends to one halogen atom, such as chlorine, bromine and iodine. The elimination of both halogen atoms from a dihaloarylene molecular compound results in the formation of an optionally substituted arylene group, suitable as a recurring unit (R1) of the polyarylene (P1).

Thus, for example:
the elimination of both chlorine atoms from one molecule of p-dichlorobenzene, p-dichlorobiphenyl and their homologous of general formula Cl-($\phi$)$_N$-Cl, N being an integer from 3 to 10, results in the formation of respectively 1, 2 or N adjacent p-phenylene units; thus, p-dichlorobenzene, p-dichlorobiphenyl and their homologous of general formula Cl-($\phi$)$_N$-Cl, N as above defined, can be polymerized, so as to form p-phenylene units;

2,5-dichlorobenzophenone (p-dichlorobenzophenone) can be polymerized, so as to form 1,4-(benzoylphenylene) units;

2,5-dichloro-4'-phenoxybenzophenone can be polymerized, so as to form 1,4-(4'-phenoxybenzoylphenylene) units;

m-dichlorobenzene can be polymerized, so as to form m-phenylene units.

The blend (B) can comprise one and only one polyarylene (P1). Alternatively, it can comprise two, three, or even more than three polyarylenes (P1).

In the blend (B), the polyarylene (P1) can be in any form, except fibers. More generally, the blend (B) is usually free of any polyarylene in the form of fibers.

Preferably, the polyarylene (P1) is in at least one out of the two following forms:
polyarylene (P1) solubilized in a phase comprising poly(aryl ether ketone) (P2), possibly the matrix phase of the blend (B);
polyarylene (P1) forming a dispersing phase, possibly the matrix phase of the blend (B), said dispersing phase comprising, dispersed therein, poly(aryl ether ketone) (P2) at solubilized state;
and, possibly in addition, in one or more of the following forms
nodules of polyarylene (P1) dispersed in a phase comprising poly(aryl ether ketone) (P2), possibly the matrix phase of the blend (B);
polyarylene (P1) forming a dispersing phase, possibly the matrix phase of the blend (B), said dispersing phase comprising, dispersed therein, nodules of poly(aryl ether ketone) (P2).

Very preferably, the polyarylene (P1) is in the form of:
polyarylene (P1) solubilized in a phase comprising poly(aryl ether ketone) (P2), possibly the matrix phase of the blend (B);
and, possibly in addition, in the form of:
nodules of polyarylene (P1) dispersed in a phase comprising poly(aryl ether ketone) (P2), possibly the matrix phase of the blend (B)
wherein:
certain nodules of polyarylene (P1) may be free of poly(aryl ether ketone) (P2), and
certain other nodules of polyarylene (P1) may form themselves a dispersing phase, other than the matrix phase, comprising, dispersed therein, poly(aryl ether ketone) (P2) at solubilized state and/or in the form of sub-nodules.

The Poly(Aryl Ether Ketone) (P2)

As previously mentioned, the blend (B) comprises at least one poly(aryl ether ketone) (P2).

For the purpose of the present invention, the term "poly(aryl ether ketone)" is intended to denote any polymer of which more than 50 wt. % of the recurring units are recurring units (R2) comprising at least one carbonyl group in-between two arylene groups, said recurring units (R2) being of one or more of the following formulae:

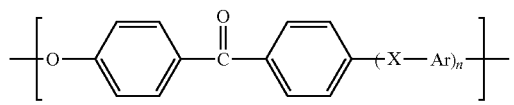

(I)

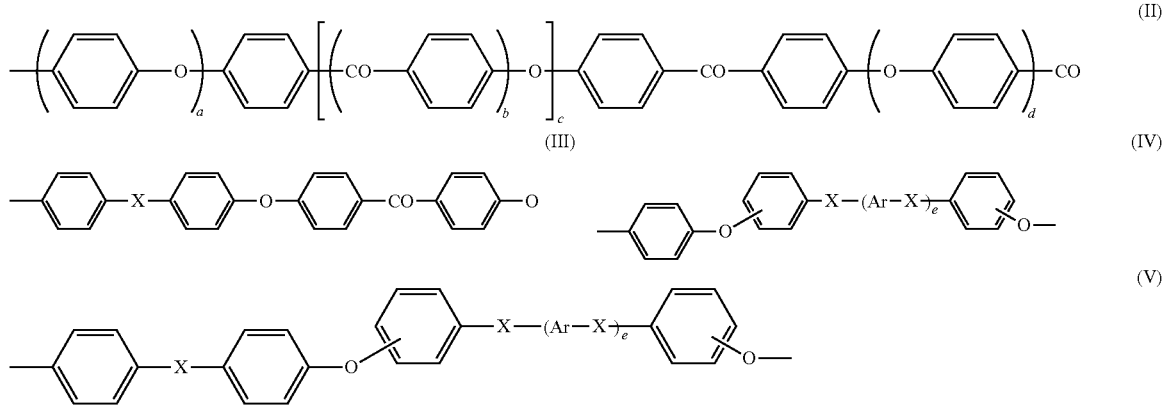
wherein
Ar is independently a divalent aromatic radical selected from phenylene, biphenylene or naphthylene,
X is independently O, C(=O) or a direct bond,
n is an integer of from 0 to 3,
b, c, d and e are 0 or 1,
a is an integer of 1 to 4, and
preferably, d is 0 when b is 1.
Recurring units (R2) may notably be chosen from:
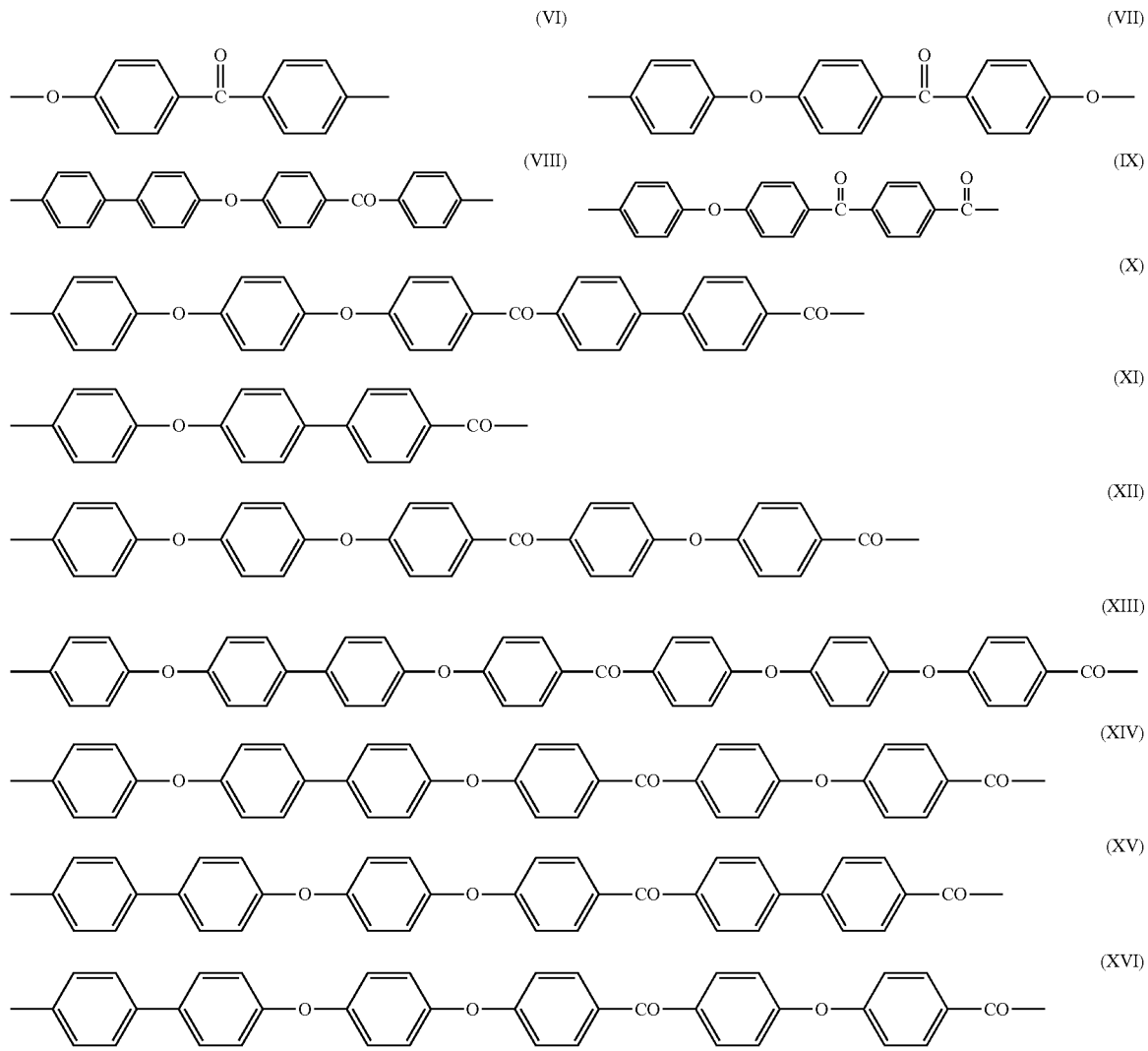

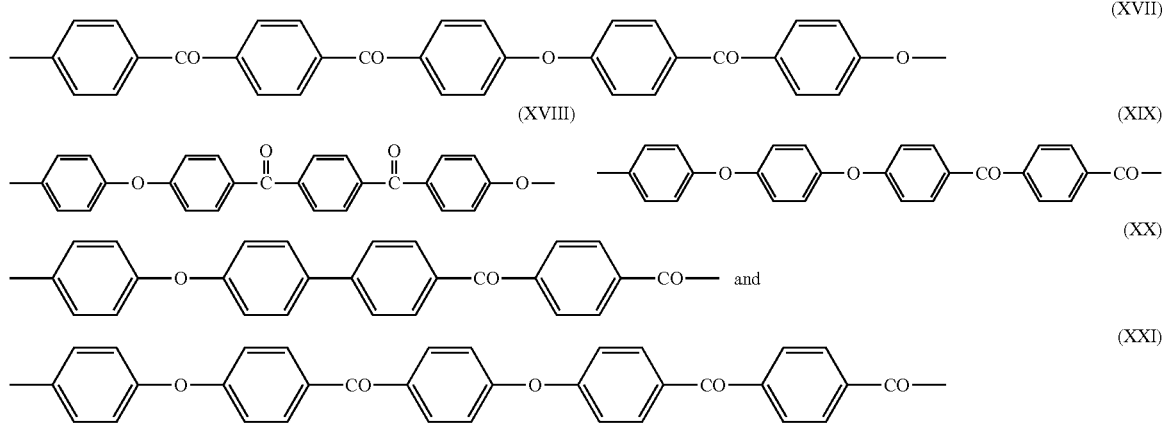

Preferably, recurring units (R2) are chosen from:

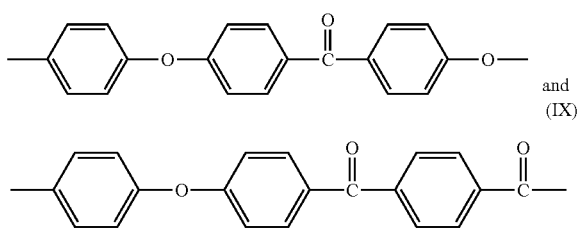

More preferably, recurring units (R2) are

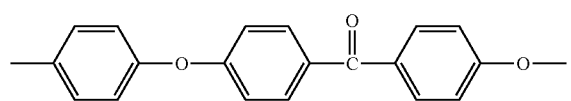

For the purpose of the present invention, a polyetheretherketone is intended to denote any polymer of which more than 50 wt. % of the recurring units are recurring units (R2) of formula (VII).

Preferably more than 70 wt. %, and more preferably more than 85 wt. % of the recurring units of the poly(aryl ether ketone) (P2) are recurring units (R2). Still more preferably, essentially all the recurring units of the poly(aryl ether ketone) (P2) are recurring units (R2). Most preferably, all the recurring units of the poly(aryl ether ketone) (P2) are recurring units (R2).

Excellent results were obtained when the poly(aryl ether ketone) (P2) is a polyetheretherketone homopolymer, i.e. a polymer of which essentially all, if not all, the recurring units are of formula (VII). VICTREX® 150 P and VICTREX® 450 P PEEKs from Victrex Manufacturing Ltd., and GATONE® and KETASPIRE™ PEEKs from Solvay Advanced Polymers, L.L.C. are examples of polyetheretherketone homopolymers.

The poly(aryl ether ketone) (P2) has advantageously a reduced viscosity (RV) of at least 0.60 dl/g, as measured in 95-98% sulfuric acid (d=1.84 g/ml) at a poly(aryl ether ketone) concentration of 1 g/100 ml. The measurement is performed using a No 50 Cannon-Fleske viscometer. RV is measured at 25° C. in a time less than 4 hours after dissolution, to limit sulfonation. The RV of the poly(aryl ether ketone) (P2) is preferably of at least 0.65 dl/g, more preferably of 0.70 dl/g. Besides, the RV of the poly(aryl ether ketone) (P2) is advantageously of at most 1.20 dl/g, preferably at most 1.10 and still more preferably at most 1.00 dl/g.

The poly(aryl ether ketone) (P2) can be amorphous (i.e. it has no melting point) or semi-crystalline (i.e. it has a melting point). It is usually semi-crystalline; the case being, the melting point of the poly(aryl ether ketone) (P2) is advantageously greater than 150° C., preferably greater than 250° C., more preferably greater than 300° C. and still more preferably greater than 325° C.

The poly(aryl ketone) (P2) can be prepared by any method. One well known in the art method contains reacting a substantially equimolar mixture of at least one bisphenol and at least one dihalobenzoid compound or at least one halophenol compound as described in Canadian Pat. No. 847,963. Non limitative example of bisphenols useful in such a process are hydroquinone, 4,4'-dihydroxybiphenyl and 4,4'-dihydroxybenzophenone; non limitative examples of dihalobenzoid compounds useful in such a process are 4,4'-difluorobenzophenone, 4,4'-dichlorobenzophenone and 4-chloro-4'-fluorobenzophenone; non limitative examples of halophenols compounds useful in such a process are 4-(4-chlorobenzoyl)phenol and (4-fluorobenzoyl)phenol. Accordingly, PEEK homopolymers may notably be produced by the nucleophilic process as described in, for example, U.S. Pat. No. 4,176,222, the whole content of which is herein incorporated by reference.

Another well known in the art method to produce PEEK homopolymers comprises electrophilically polymerizing phenoxyphenoxybenzoic acid, using an alkane sulfonic acid as solvent and in the presence of a condensing agent, as the process described in U.S. Pat. No. 6,566,484, the whole content of which is herein incorporated by reference. Other poly(aryl ether ketone)s may be produced by the same method, starting from other monomers than phenoxyphenoxybenzoic acid, such as those described in U.S. Pat. Appl. 2003/0130476, the whole content of which is also herein incorporated by reference.

The blend (B) can comprise one and only one poly(aryl ether ketone) (P2). Alternatively, it can comprise two, three, or even more than three poly(aryl ether ketone)s (P2). Certain preferred mixes of poly(aryl ether ketone)s (P2) are : mixes consisting of (i) at least one poly(aryl ether ketone) (P2a) of which more than 50 wt. % of the recurring units, preferably essentially all the recurring units, and still more preferably all the recurring units are of formula

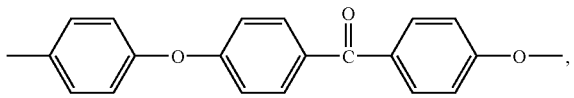

(VII)

with (ii) at least one poly(aryl ether ketone) (P2b) of which more than 50 wt. % of the recurring units, preferably essentially all the recurring units, and still more preferably all the recurring units are of formula

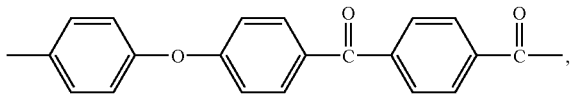

(IX)

and, optionally in addition, with (iii) at least one other poly (aryl ether ketone) (P2c) different from poly(aryl ether ketone)s (P2a) and (P2b);

in particular, mixes consisting of (i) at least one poly(aryl ether ketone) (P2a) of which essentially all, if not all, the recurring units are of formula (VII) with (ii) at least one poly(aryl ether ketone) (P2b) of which essentially all, if not all, the recurring units are of formula (IX);

still more particularly, binary mixes consisting of (i) one poly(aryl ether ketone) (P2a) of which all the recurring units are of formula (VII) with (ii) one poly(aryl ether ketone) (P2b) of which all the recurring units are of formula (IX).

The Fibrous Filler (F)

Quite surprisingly, the presence of a fibrous filler in a blend comprising a polyarylene and a poly(aryl ether ketone) causes said polyarylene and said poly(aryl ether ketone) to work synergistically. Concretely, the blend (B) exhibits beneficially certain properties at an improved level with regard to (i) the level achieved by the blend obtained by replacing totally, weight pro weight, in the blend (B), the poly(aryl ether ketone) by the polyarylene, and, (ii) the level achieved by the blend obtained by replacing totally, weight pro weight, in the blend (B), the polyarylene by the poly(aryl ether ketone). An especially valuable example of property for which this synergistic effect was observed is the impact resistance, as characterized by a standard notched Izod test (ASTM D-256).

For the purpose of the present invention, a fibrous filler is intended to denote any organic or inorganic compound in the form of fibers. The term "fibers" is intended to used here in its common meaning, with which the skilled in the art is well familiar, i.e. slender and greatly elongated solid bodies, having the appearance of a straight light, also sometimes referred to as filaments. Fibers are usually characterized by a length and by a diameter; the diameter of the fibers being considerably lower than their length.

For convenience, the length of a fiber can be defined as the longest dimension of the fiber (i.e. the longest straight line which goes right through the fiber, from the material point where it enters the fiber to the material point where it exits the fiber) or, from a more practical point of view, as the longest dimension of the projection of the fiber on a photograph, as it appears on said photograph. On the other hand, the diameter of a fiber can be defined as the longest dimension of the fiber which is included in a plane perpendicular to its length (or, from a more practical point of view, as the longest dimension of the projection of the fiber on a photograph, which is perpendicular to its length).

When an image analysis software is used, it can also be relied upon more complex definitions for the length and the diameter, which aim at providing a length and a diameter which correspond exactly to the length and diameter of a cylinder, if a measured fiber had a perfect cylindrical shape. As an example thereof, the length of a fiber can be defined as the height of the hypothetical cylinder of smallest volume enveloping the fiber, while the diameter of a particle can be defined as the diameter of said hypothetical cylinder ("method of the cylindrical envelope"). In practice, when a photograph is used, the projection of the fiber on the photograph is accounted for instead of the fiber itself; the hypothetical cylinder of smallest volume is replaced by the hypothetical rectangle of smallest surface enveloping the projection of the fiber, and the length and the width of said hypothetical rectangle are defined as the length and the diameter of the fiber ("method of the rectangular envelope"). Further, in the case of fibers, it is generally easy for the skilled person to determine in good approximation the rectangle of smallest surface just by visual inspection; then, the method of the rectangular envelope can be applied by setting the image analysis software in "manual mode", as detailed below.

The filamentous aspect of fibers can be quantified notably by means of their number-average aspect ratio $\alpha$; $\alpha$ is generally defined as the sum of the individual aspect ratios $\alpha_i$ of the fiber particles (each fiber particle "i" being taken separately) divided by the total number of the fiber particles, wherein the aspect ratio $\alpha_i$ of a fiber particle "i" is the ratio of the length $L_i$ of the fiber particle "i" divided by its diameter $D_i$.

The number-average aspect ratio of the fibers can advantageously be determined by Scanning Electron Microscopy (SEM) coupled with an image analysis software. To this purpose, a S-4300 Field Emission Scanning Electron Microscope (FESEM) from HITACHI, using backscattered electron imaging (BSE) to increase the atomic contrast can be used. The length and the diameter of each particle taken individually can be measured using QUARTZ PCI (version 5.1) image analysis software from SCIENTIFIC IMAGE MANAGEMENT SYSTEM. The software is prealably calibrated using a traceable certified standard. The software is advantageously used in "manual" mode (i.e. with no automatic shape recognition and measurement); accordingly, the characteristic dimensions of each fiber particle, i.e. its length and its diameter (for example, as defined per the "method of the rectangular envelope"), are measured individually by clicking successively on the extremities of these dimensions; then, for each dimension of each fiber particle, the software calculates a number of pixels, that is converted into nanometers. Only the fiber particles entirely visible in the field of view are measured; particles touching the edge of the field of view are discarded. Fiber particles crossing each other are measured individually; if only one "half" of one of the fiber particles that cross each other is visible, this fiber particle is not measured. A high number of measurements are made (well above 100 and, preferably, more than 1000), so as to get representative data. The results are then imported in Microsoft EXCEL and statistical data are calculated.

The fibrous filler (F) has a number average length generally of at least 5 μm, preferably at least 100 μm, more preferably at least 500 μm and still more preferably at least 2500 μm. On the other hand, the fibrous filler (F) has a number average length of generally at most 50000 µm (50 mm), preferably at most 20000 µm (20 mm), and more preferably at most 10000 µm (10 mm).

The fibrous filler (F) has a number average diameter generally of at most 50 µm, preferably at most 30 µm, more preferably at most 20 µm and still more preferably at most 15 µm. On the other hand, the fibrous filler (F) has a number average diameter of generally at least 0.05 µm (50 nm), preferably at least 0.5 µm (500 nm), more preferably at least 2.5 µm (2500 nm), and still more preferably at least 5 µm (5000 nm).

The fibrous filler (F) has a number average aspect ratio generally of at least 5, preferably at least 10, more preferably at least 30, still more preferably at least 100, and most preferably at least 300. On the other hand, the fibrous filler (F) has a number average aspect ratio of generally at most 10000, preferably at most 3000 and more preferably at most 1000.

Non limitative examples of fibrous fillers (F) useful for the present invention are: glass fibers; asbestos fibers; organic fibers formed from high temperature engineered resins like poly(benzothiazole) fibers, poly(benzimidazole) fibers, poly(benzoxazole) fibers, polyarylether fibers and aramide fibers; carbon fibers; PTFE fibers; boron fibers (e.g. obtained by deposition of boron microgranules on a tungsten or carbonate yarn); steel fibers; metal fibers such as aluminum fibers and magnesium fibers; aluminum silicate fibers, ceramic fibers like silicon nitride $Si_3N_4$; talc-glass fibers; calcium silicate fibers like wollastonite fibers; silicon carbide fibers; metal borides fibers (e.g. $TiB_2$); and rock wool fibers.

The fibrous filler (F) is preferably chosen from carbon fibers and glass fibers.

Certain carbon fibers useful for the present invention are obtained by heat treatment and pyrolysis of different polymeric precursors such as, for example, rayon, polyacrylonitrile (PAN), aromatic polyamide or phenolic resin. Certain other carbon fibers useful for the present invention are obtained from pitchy materials ("pitch-based carbon fibers"). The terms "graphite fibers" intend to denote carbon fibers obtained by high temperature pyrolysis (over 2000° C.) of carbon fibers, wherein the carbon atoms place in a way similar to the graphite structure; these ones have advantageously a graphite content above 95.0%, preferably above 99.0%. Still certain other carbon fibers are known as vapor grown carbon fibers; these ones are notably produced by thermally decomposing a raw material gas, such as hydrocarbon gas, in a vapor phase in the presence of a metallic catalyst, and by growing the decomposition product into a fibrous shape; they are notably commercially available as VGCF™ from Showa Denko K.K., and as PYROGRAF® from ASI or its subsidiary Pyrograf Products, Inc. Carbon fibers useful for the present invention are preferably chosen from the group composed of PAN-based carbon fibers, pitch-based carbon fibers and graphite fibers.

The fibrous filler (F) is preferably chosen from glass fibers.

The fibrous filler (F) is preferably formulated with a high temperature sizing, since said high temperature sizing providing generally superior interfacial adhesion with polymers that require generally to be processed at high temperatures like poly(aryl ether ketone)s. Polyphenylene oxides are examples of such suitable high temperature sizing.

Especially well-suited fibrous fillers are VETROTEX SGVA 910 glass fibers from VETROTEX SAINT-GOBAIN, and equivalents thereof.

Embodiment (E*)

In a particular embodiment of the present invention (E*), the poly(aryl ether ketone) (P2) is a poly(aryl ether sulfone), namely a polymer of which at least 5 wt. % of the recurring units are recurring units of one or more formulae comprising at least one arylene group, at least one ether group (—O—) and at least one sulfone group [—S(=O)$_2$—].

In embodiment (E*), the poly(aryl ether ketone) (P2) may comprise: (i) repeating units (PhSO$_2$Ph)$_n$ linked through ether and/or thioether, where n is 1 to 3 or can be fractional in this range, and (ii) structural units (Ph)$_k$ so linked, wherein Ph is phenylene (especially para-phenylene), "k" is 1 to 3 or can be fractional within this range, and at least part of such phenylenes are linked linearly through a divalent —CO— group, the remaining part of such phenylenes, if any, being fused together or are linked through a single chemical bond or a divalent group other than SO$_2$ and —CO—.

By "fractional" reference is made to the average value for a given polymer chain containing units having various values of "n" or "k".

In embodiment (E*), the polyarylene (P1) may meet all the characteristics of the polyphenylenes described in PCT/EP2006/060535, as long as they are compatible with those of the polyarylene (P1) described in the present document.

In embodiment (E*), the fibrous filler (F) may be notably a reinforcing fiber as cited in PCT/EP2006/060535, such as glass fiber or carbon fiber.

The person skilled in the art will understand that the invention is not intended to be limited to this particular embodiment (E*), but encompasses also any embodiment other than (E*) which is described in the present document. Besides, various modifications to the embodiments described in the present document will be readily apparent to those skilled in the art, and the generic principles defined herein may be applied to other embodiments without departing from the spirit and scope of the invention; thus, this invention is also not intended to be limited to all the embodiments shown, but is to be accorded the widest scope consistent with the principles and features disclosed herein.

Optional Ingredients of the Blend (B)

The blend (B) may further contain a variety of other non fibrous polymers, and non fibrous non polymeric additives, collectively called ingredients. Conventional ingredients of polyarylene and poly(aryl ether ketone) blends include particulate fillers and nucleating agents such as talc and silica, adhesion promoters, compatibilizers, curing agents, lubricants, metal particles, mold release agents, organic and/or inorganic pigments like TiO$_2$ and carbon black, dyes, flame retardants, smoke-suppressing agents, heat stabilizers, antioxidants, UV absorbers, tougheners such as rubbers, plasticizers, anti-static agents, melt viscosity depressants such as liquid crystalline polymers and the like.

The weight of said optional ingredients, based on the total weight of the blend (B), is advantageously of at most 40%, preferably at most 20%, more preferably at most 10% and still more preferably at most 5%. Excellent results were obtained when the blend (B) was essentially free, or even was completely free, of said optional ingredients.

The Preparation of the Invented Blend

The blend (B) can be prepared by any method.

An aspect of the present invention is directed to a method for preparing the blend (B), which comprises mixing at least one polyarylene (P1) in a form other than fibers with at least one poly(aryl ether ketone) (P2) and at least one fibrous filler (F), at a temperature above the melt temperature of the polyarylene (P1) and the melt temperature of the poly(aryl ether ketone) (P2).

For the purpose of the present invention, the melt temperature of a polymer is its glass transition temperature, if said polymer is amorphous, and its melting point, if said polymer is semi-crystalline.

The melt temperature of the polyarylene (P1) and the melt temperature of the poly(aryl ether ketone) (P2) can be measured by any suitable technique known from the skilled in the art. Very often, it is measured by Differential Scanning Calorimetry, using for example a Universal V3.7A Instruments DSC calorimeter. For this purpose, it is preliminarily checked that the calorimeter is well-calibrated by means of a calibration sample. Then, the polymer of which the melt temperature has to be measured [polymer (P1) or (P2)] is submitted to the following heating/cooling cycle: $1^{st}$ heating from room temperature (20° C.) up to $T_{max}$ at a rate of 10° C./min, followed by cooling from $T_{max}$ down to room temperature at a rate of 20° C./min, followed by 2 heating from room temperature up to $T_{max}$ at a rate of 110° C./min. Here, $T_{max}$ denotes the maximum temperature of the cycle; $T_{max}$ is chosen so as to be well above the melt temperature of the polymer submitted to the determination, but well below the temperature at which the polymer starts to degrade; values of $T_{max}$ of from about 30° C. to about 100° C. above the melt temperature are in general suitable; values of $T_{max}$ of about 220° C. may be appropriate to measure the melt temperature, in particular the glass transition temperature, of the polyarylene (P1), while values of $T_{max}$ of about 400° C. may be appropriate to measure the melt temperature, in particular the melting point, of the poly(aryl ether ketone) (P2).

The melt temperature is measured during $2^{nd}$ heating.

When the melt temperature of the polymer (P1) or (P2) is its melting point, melting is an endothermic first-order transition that appears as a negative peak on the DSC scan. The melting point is advantageously determined by a certain construction procedure on the heat flow curve: the intersection of the two lines that are tangent to the peak at the points of inflection on either side of the peak define the peak temperature, namely the melting point.

When the glass transition temperature of the polymer (P1) or (P2) is its glass transition temperature, this one is advantageously determined by a certain other construction procedure on the heat flow curve: a first tangent line to the curve above the transition region is constructed; a second tangent line to the curve below the transition region is also constructed; the temperature on the curve halfway between the two tangent lines, or ½ delta Cp, is the glass transition temperature.

The melt mixing of the polyarylene (P1) with the poly(aryl ether ketone) (P2) and the fibrous filler (F) can be achieved by any appropriate means. The mixing is advantageously made under a sufficiently high shear, so as to achieve a high degree of mixing of both polymers in the blend (B) ("shear-mixing"). The mixing can notably be achieved in a desirable manner by extruding the polyarylene (P1) with the poly(aryl ether ketone) (P2) and the fibrous filler (F), at a temperature above the melt temperature of the polyarylene (P1) and the melt temperature of the poly(aryl ether ketone) (P2), so as to obtained strands of the blend (B). Very preferably, the so-obtained strands are then chopped into pellets.

The invented method preferably further comprises the step of dry mixing the polyarylene (P1), preferably in powder or in granular form, with the poly(aryl ether ketone) (P2), preferably in powder or in granular form, and the fibrous filler (F) at a temperature below the melt temperature of the polyarylene (P1) and the melt temperature of the poly(aryl ether ketone) (P2), prior to the melt mixing step.

End Uses of the Blend (B)

As previously mentioned, another aspect of the present invention is directed to a shaped article or a part of a shaped article comprising the blend (B) as above described.

Non limitative examples of shaped articles or part of shaped articles in accordance with the present invention include:

Films

Many different methods may be used to form films. Either continuous or batch processes may be used.

Films may be formed from the melt of the blend (B). Films may be extruded from the melt through a slit. Films may be formed by blow extrusion.

Films may also be further processed by stretching and/or annealing. Special films such as bilayers, laminates, porous films, textured films and the like may be produced by techniques known in the art.

Films comprising the blend (B) may be oriented by stretching. Stretching along one dimension will result in uniaxial orientation. Stretching in two dimensions will give biaxial orientation. Stretching may be aided by heating near the glass transition temperature. Stretching may also be aided by plasticizers. More complex processes such as applying alternating cycles of stretching and annealing may also be used with the blends of the present invention.

Coatings

In contrast with films which are generally uncoated, coatings are usually coated on a substrate. The expression "coated on a substrate" should be understood in its common sense, i.e. that the coating forms a cover over the surface of a substrate, thereby without including any limitation as to the process used to achieve the coating. The surface of the substrate may be partly or completely covered by the coating.

The thickness of the coating is usually of at least 1 μm, preferably of at least 5 μm, more preferably of at least 10 μm, and still more preferably of at least 20 μm. Besides, the thickness of the coating is usually of at most 10000 μm, preferably of at most 1000 μm, more preferably of at most 500 μm. In certain embodiments, the thickness of the coating may be of no more than 200 μm, and even non more than 100 μm.

Coatings may be formed by known techniques, including but not limited to, powder coating, laminating preformed films, coating from solution or from the melt, and like methods.

An aspect of the present invention is an article comprising a substrate, onto which the coating as above described is coated.

A particular aspect of the present invention of particularly high technical interest is directed to the use of the coating as above described, for ablative insulation. Accordingly, the coating is coated on a substrate such as a metal, and the coating is submitted to an aggressive agent which destroys partly or completely the coating; the coating is then used as a "sacrificed" layer, to protect the substrate against the aggressive agent. A first type of aggressive agent is a body which is in relative motion with regard to the coating and rubs against it; the body is usually more abrasive than the coating itself. Another type of aggressive agent lies in flames, which may originate from uncontrolled or controlled fires, in particular from the deliberate combustion of fuels. Still another type of aggressive agent is chosen from chemicals. Combinations of these different types of aggressive agents are also encompassed.

Membranes

The blend (B) may be fabricated into membranes useful for separations of mixed gases, liquids and solids.

Other Shaped Articles or Parts of Shaped Articles

The blend (B) may also be fabricated into sheets, and various three-dimensional shaped articles and parts of shaped articles such as hollow bodies (containers and the like).

Various molding techniques may be used to form shaped articles from blend (B):

Molding Techniques

Powders, pellets, beads, flakes, reground material or other forms of the blend (B) may be molded, with or without liquid or other additives, premixed or fed separately. In particular embodiments, the blend (B) can be compression molded. Exact conditions may be determined by trial and error molding of small samples. The blend (B) can also be injection molded. It is also desirable if the blend (B) can be remelted several times without degradation, so that regrind from molding processes can be used. One skilled in the art will recognize that other factors also influence injection moldability including the material's stress relaxation properties and the temperature dependence of melt viscosity.

Extrusion Techniques

The blend (B) can also be extruded. Non-limiting examples include angle, channel, hexagonal bar, hollow bar, I-beam, joining strip, tubes, rectangular tube, rod, sheet, plate, square bar, square tube, T-section, thin-walled tubes, microtubes, strands, rectangular strands, or other shapes as is required for a particular application.

Thermoforming

Sheet stock may be cut, stamped, welded, or thermally formed. For example, printed wiring boards may be fabricated from sheet or thick films by a process wherein copper is deposited on to one or both sides, patterned by standard photolithographic methods, etched, then holes are drilled, and several such sheets laminated together to form a finished board. Sheet and film may also be thermoformed into any variety of housings, cabinets, containers, covers, chassis, plates, panels, fenders, hoods, and the like.

The Unexpected Merits of the Invention

It was surprisingly found that, in spite of substantial discrepancies in their molecular structure, the polyarylene (P1) and the poly(aryl ether ketone) (P2) contained in the blend (B) were in general at least partially miscible with each other, the miscible portion of both polymers forming then a single phase [(P1) being solubilized in (P2) or the contrary, depending on the relative amounts of both polymers].

Also surprisingly, the blend (B) exhibits a superior balance of properties, including:
 a very high strength [higher than that of neat poly (aryletherketone)s]
 a very high stiffness [higher than that of neat poly (aryletherketone)s and neat polyarylenes]; and
 a very high impact resistance, as characterized by a standard notched IZOD test [higher than that of neat or fiber-reinforced poly(aryl ether ketone)s and fiber-reinforced polyarylenes].

It exhibits also generally
 a ductile break;
 a good melt processability (better than that of neat or fiber-reinforced polyarylenes);
 a high thermal stability (higher than that of neat or fiber-reinforced polyarylenes); and
 a high chemical resistance (higher than that of neat or fiber-reinforced polyarylenes).

In addition, the blend (B) may further exhibit a substantially higher heat deflection temperature than that of neat poly(aryl ether ketone)s and neat or fiber-reinforced polyarylenes, making it suitable for certain particular very demanding applications where articles are used under stress at high temperature.

EXAMPLES

The present invention is described in greater detail below by referring to the examples; however, the present invention is not limited to these examples.

The ingredients that were used are :
 a polyphenylene copolymer essentially all, if not all, the recurring units of which consisted of a mix of p-phenylene substituted by a phenylketone group with unsubstituted m-phenylene in a mole ratio p-phenylene:m-phenylene of about 50:50, commercially available from Solvay Advanced Polymers, L.L.C. as PRIMOSPIRE™ PR-250 polyphenylene ;
 a polyetheretherketone (PEEK) homopolymer, essentially all, if not all, the recurring units are of formula (VII)

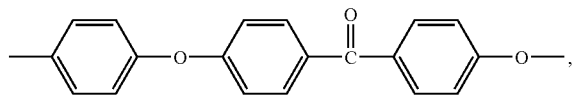
(VII)

commercially available from Victrex Manufacturing Ltd. as VICTREX® 150 P ;
 VETROTEX SGVA 910 glass fiber, commercially available from VETROTEX SAINT-GOBAIN.

All the polymer and polymer blends, whatever reinforced or not, were compounded on a Berstorff 25 mm twin-screw co-rotating intermeshing extruder.

In case of the reinforced polymers [(E1) and (E5)] and the reinforced polymer blends [(E2), (E3) and (E4)], the glass fiber was metered into the melt at a downstream port.

In the case of the neat polymers [(E6) and (E10)], the compounding step was to convert the resins from powder to pellet form and to impart the same heat history seen by the reinforced polymers and the various blends on the neat polymers.

Mechanical property tests were conducted per the ASTM methods indicated using 3.2 mm-thick ASTM specimens.

Isothermal thermogravimetric analysis (TGA) weight loss rate was measured in nitrogen after rapid heat up to 380° C. (100° C./min) followed by a hold duration of 40 minutes. The rate of weight loss (ppm/min) was computed from the slope of the TGA weight versus time plot over the time interval from 40 to 60 minutes.

The results are presented in table 1 below as concerns reinforced polymers and polymer blends, and in table 2 as concerns unreinforced polymers and polymer blends. The reinforced polymer blends according to the present invention are reinforced blends (E2), (E3) and (E4).

TABLE 1

Results relative to reinforced polymers and polymer blends

| | ASTM Method | (E1) | (E2) | (E3) | (E4 | (E5) |
|---|---|---|---|---|---|---|
| VICTREX ® 150 P PEEK (parts by weight) | | 70 | 49 | 35 | 21 | 0 |
| PRIMOSPIRE ™ PR-250 polyphenylene (parts by weight) | | 0 | 21 | 35 | 49 | 70 |

TABLE 1-continued

Results relative to reinforced polymers and polymer blends

| | ASTM Method | (E1) | (E2) | (E3) | (E4) | (E5) |
|---|---|---|---|---|---|---|
| VETROTEX SGVA 910 glass fiber (parts by weight) | | 30 | 30 | 30 | 30 | 30 |
| PEEK:polyphenylene weight ratio | | 100:0 | 70:30 | 50:50 | 30:70 | 0:100 |
| Tensile strength (psi) | D-638 | 26700 | 27000 | 27800 | 28600 | 25900 |
| Tensile modulus (Ksi) | D-638 | 1630 | 1710 | 1730 | 1840 | 1830 |
| Ductile break (yes/no) | D-638 | Yes | Yes | Yes | Yes | Yes |
| Flexural strength (psi) | D-790 | 38900 | 37600 | 39000 | 38800 | 37600 |
| Flexural modulus (Ksi) | D-790 | 1595 | 1635 | 1678 | 1866 | 1875 |
| Heat deflection temperature (° C.) | D-648 | >225 | 190.6 | 157.5 | 160.3 | 164.7 |
| Notched Izod (ft-lb/in) times 10 | D-256 | 10 | 13 | 13 | 11 | 8 |
| Weight loss rate by isothermal TGA at 380° C. (ppm/min) | — | 5 | 10 | 10 | 10 | 15 |

TABLE 2

Results relative to unreinforced polymers and polymer blends

| | ASTM Method | (E6) | (E7) | (E8) | (E9) | (E10) |
|---|---|---|---|---|---|---|
| VICTREX ® 150 P PEEK (parts by weight) | | 100 | 70 | 50 | 30 | 0 |
| PRIMOSPIRE ™ PR-250 polyphenylene (parts by weight) | | 0 | 30 | 50 | 70 | 100 |
| VETROTEX SGVA 910 glass fiber (parts by weight) | | 0 | 0 | 0 | 0 | 0 |
| PEEK:polyphenylene weight ratio | | 100:0 | 70:30 | 50:50 | 30:70 | 0:100 |
| Tensile strength (psi) | D-638 | 14300 | 14900 | 17400 | 19600 | 23800 |
| Tensile modulus (Ksi) | D-638 | 514 | 584 | 654 | 723 | 874 |
| Ductile break (yes/no) | D-638 | Yes | Yes | Yes | Yes | No |
| Flexural strength (psi) | D-790 | 21600 | 23400 | 26900 | 29900 | 36600 |
| Flexural modulus (Ksi) | D-790 | 538 | 594 | 677 | 757 | 921 |
| Heat deflection temperature (° C.) | D-648 | 147.0 | 147.8 | 149.0 | 149.7 | 152.1 |
| Notched Izod (ft-lb/in) times 10 | D-256 | 10 | 8 | 8 | 9 | 13 |
| Weight loss rate by isothermal TGA at 380° C. (ppm/min) | — | 10 | 10 | 10 | 10 | 30 |

Blends (E2) to (E4) (according to the invention), exhibited an excellent balance of properties, including a very high strength [about twice as high as that of neat poly(aryletherketone) (E6)], a very high stiffness [more than three times higher that of neat poly(aryletherketone) (E6) and about twice as high as that of neat polyarylene (E10)].

They exhibited also a very high impact resistance, as characterized by a standard notched IZOD test, higher than that of neat poly(aryl ether ketone) (E6), fiber-reinforced polyaryletherketone (E1) and fiber-reinforced polyarylene (E5) in particular, the notched Izod of reinforced blends (E2) and (E3) was more than 1.5 times as high as that of the fiber-reinforced polyarlylene (E5) and it was increased by not less than 30% when compared to the notched Izod of the fiber-reinforced poly(aryletherketone) and of its neat homologue [samples (E1) and (E6) respectively]. Thus, in the presence of glass fibers, the poly(aryletherketone) and the polyarylene were surprisingly shown to act synergistically, resulting in an increase of the notched Izod up to a level higher than that of the reinforced polymers taken individually; on the other hand, such a synergistic effect was completely lost when glass fibers were removed from the polymer blends (compare the notched Izod of unreinforced blends (E7), (E8) and (E9) with the notched Izod of the neat polymers: in this case, the blending of the polymers resulted in a decrease of property when compared to the level achieved by the polymers taken individually).

Blends (E2) to (E4) (according to the invention) exhibited also
- a ductile break;
- a good melt processability (better than that of neat polyarylene (E10) or fiber-reinforced polyarylene (E5));
- a high thermal stability (higher than that of neat polyarylene and fiber-reinforced polyarylene); and
- a high chemical resistance (higher than that of neat polyarylene and fiber-reinforced polyarylene).

Also surprisingly, blend (E2) exhibited further a much higher heat deflection temperature than that of neat poly(aryl ether ketone) (E6), neat polyarylene (E10) and even fiber-reinforced polyarylene (E5) [+44, 39 and 26° C. respectively], making such blend suitable for certain particular very demanding applications where articles are used under stress at high temperature. This is especially surprising since, as concerns the heat deflection temperature, blends (E3) and (E4), with a lower amount of poly(aryletherketone), did not exhibit any progress at all when compared to reinforced polyarylene (E5) [a slight decrease was even observed].

The invention claimed is:

1. A blend (B) comprising:
   at least one polyarylene (P1) in a form other than fibers,
   at least one poly(aryl ether ketone) (P2), and
   at least one fibrous filler (F),
   wherein said polyarylene (P1) is a polymer of which more than 25 wt. % of the recurring units therein are recurring units (R1) of one or more formulae consisting of an arylene group, which may be unsubstituted or substituted by at least one monovalent substituting group, provided said arylene group is linked by each of its two ends to two other optionally substituted arylene groups via a direct C-C linkage, and wherein said arylene group is a hydrocarbon divalent group consisting of one core composed of one benzenic ring or of a plurality of benzenic rings fused together by sharing two or more neighboring ring carbon atoms, and of two ends.

2. The blend according to claim 1, wherein the weight of the polyarylene (P1), based on the total weight of the polyarylene (P1) and the poly(aryl ether ketone) (P2), is of at least 30%.

3. The blend according to claim 1, wherein the weight of the polyarylene (P1), based on the total weight of the polyarylene (P1) and the poly(aryl ether ketone) (P2), is of at most 50%.

4. The blend according to claim 1, wherein the total weight of the polyarylene (P1) and the poly(aryl ether ketone) (P2), based on the total weight of the blend (B), is of at least 60%.

5. The blend according to claim 1, wherein the weight of the fibrous filler (F), based on the total weight of the blend (B), is at least 10%.

6. The blend according to claim 5, wherein the weight of the fibrous filler (F), based on the total weight of the blend (B), is at least 20%.

7. The blend according to claim 1, wherein the polyarylene (P1) is a polyphenylene copolymer, essentially all the recurring units of which consist of a mix of p-phenylene substituted by a phenylketone group with unsubstituted m-phenylene in a mole ratio p-phenylene:m-phenylene of from 5:95 to 95:5.

8. The blend according to claim 7, wherein the mole ratio p-phenylene:m-phenylene is from 30:70 to 70:30.

9. The blend according to claim 1, wherein more than 50 wt. % of the recurring units of the poly(aryl ether ketone) (P2) are recurring units (R2) selected from the group consisting of:

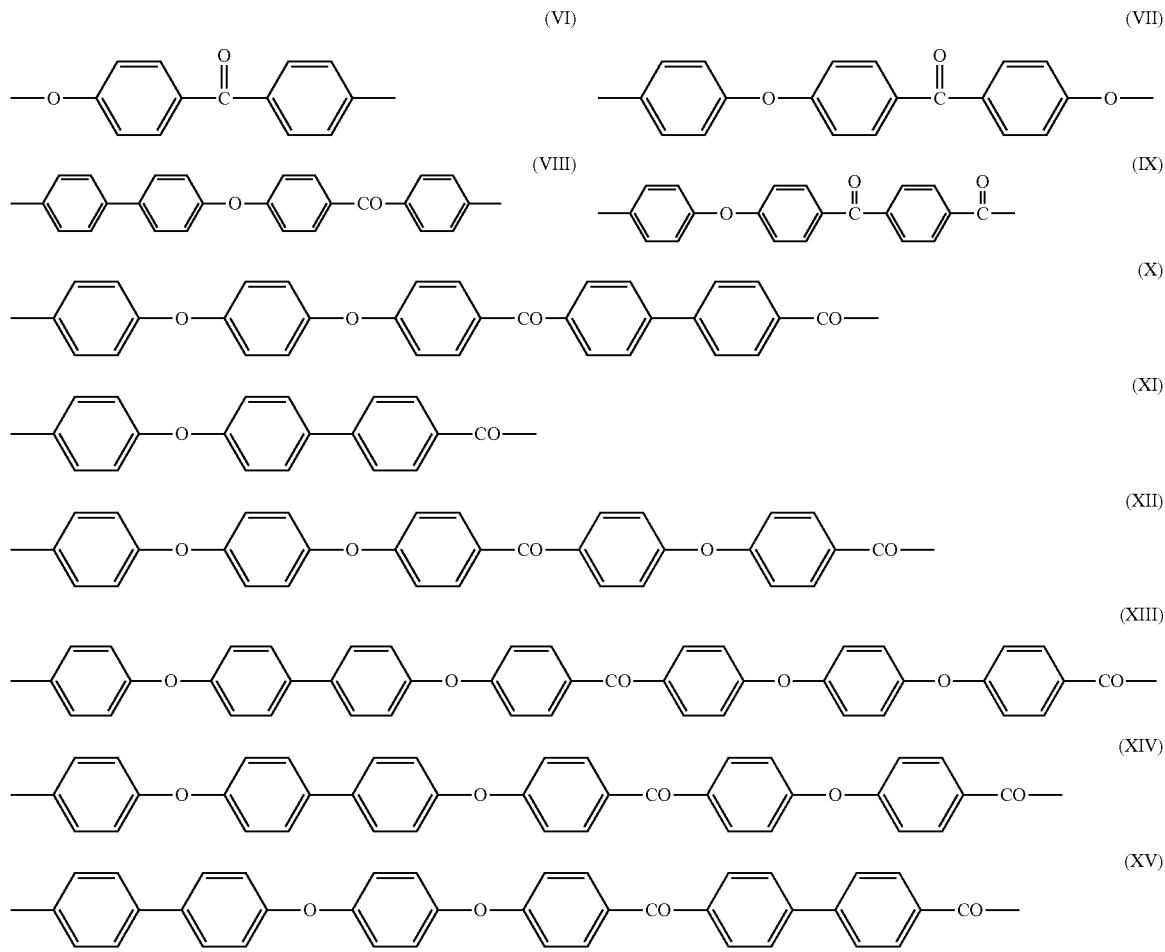

-continued

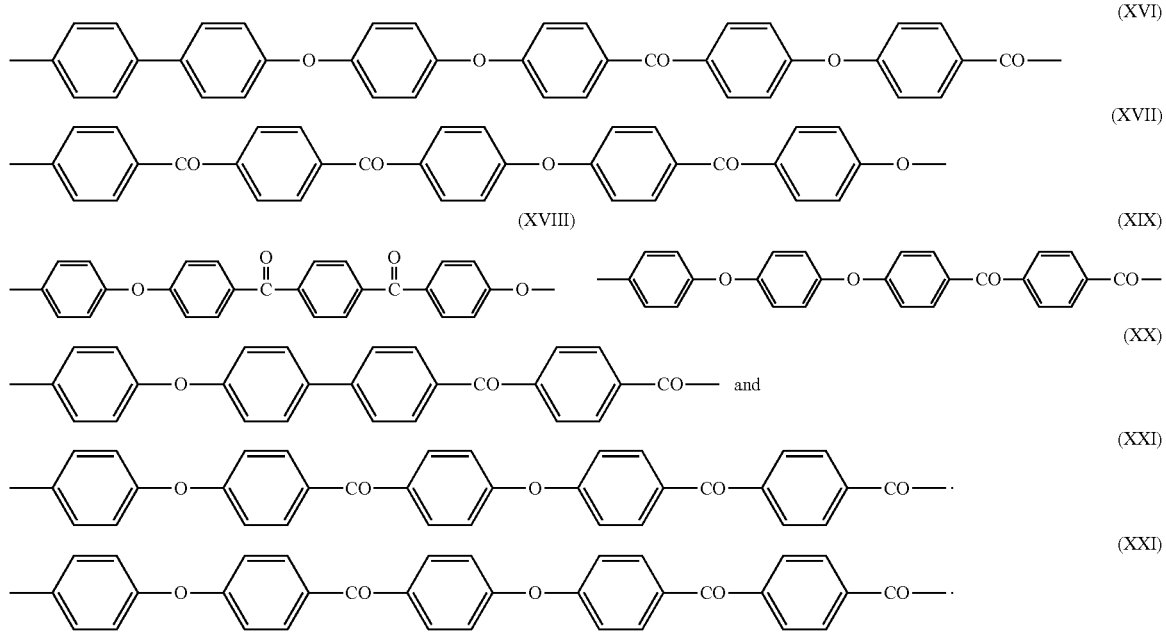

10. The blend according to claim 9, wherein the poly(aryl ether ketone) (P2) is a polyetheretherketone (PEEK) homopolymer, essentially all the recurring units are of formula

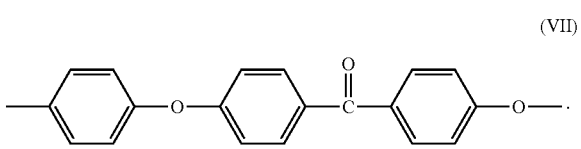

11. The blend according to claim 1, wherein the fibrous filler (F) has a number average length of at least 100 μm.

12. The blend according to claim 11, wherein the fibrous filler (F) has a number average length of at least 2500 μm.

13. The blend according to claim 1, wherein the fibrous filler (F) has a number average diameter of at most 20 μm.

14. The blend according to claim 1, wherein the fibrous filler (F) has a number average aspect ratio of at least 10.

15. The blend according to claim 14, wherein the fibrous filler (F) has a number average aspect ratio of at least 100.

16. The blend according to claim 1, wherein the fibrous filler (F) is chosen from carbon fibers and glass fibers.

17. The blend according to claim 16, wherein the fibrous filler (F) is chosen from glass fibers.

18. A shaped article or a part of a shaped article comprising the blend according to claim 1.

19. The shaped article or the part of a shaped article according to claim 18, being selected from the group consisting of films, coatings, membranes, and sheets.

20. The shaped article or the part of a shaped article according to claim 18, being three-dimensional.

* * * * *